United States Patent
Phillipps et al.

(10) Patent No.: US 9,218,574 B2
(45) Date of Patent: Dec. 22, 2015

(54) USER INTERFACE FOR MACHINE LEARNING

(71) Applicant: PurePredictive, Inc., Sandy, UT (US)

(72) Inventors: Kelly D. Phillipps, Salt Lake City, UT (US); Richard W. Wellman, Park City, UT (US)

(73) Assignee: PurePredictive, Inc., Sandy, UT (US)

( * ) Notice: Subject to any disclaimer, the term of this patent is extended or adjusted under 35 U.S.C. 154(b) by 237 days.

(21) Appl. No.: 13/904,963

(22) Filed: May 29, 2013

(65) Prior Publication Data

US 2014/0358825 A1 Dec. 4, 2014

(51) Int. Cl.
*G06N 99/00* (2010.01)
*G06Q 30/02* (2012.01)

(52) U.S. Cl.
CPC .......... *G06N 99/005* (2013.01); *G06Q 30/0241* (2013.01)

(58) Field of Classification Search
CPC ....... G06N 99/005; G06N 99/00; G06N 5/04; G06N 5/02; G06N 5/025; G06Q 30/0241; G06F 3/048
USPC ...................................................... 706/11–12
See application file for complete search history.

(56) References Cited

U.S. PATENT DOCUMENTS

| | | | |
|---|---|---|---|
| 3,327,291 A | 6/1967 | Lee | |
| 5,719,692 A | 2/1998 | Cohen | |
| 5,832,467 A | 11/1998 | Wavish | |
| 5,963,910 A | 10/1999 | Ulwick | |
| 6,018,619 A | 1/2000 | Allard et al. | |
| 6,112,304 A | 8/2000 | Clawson | |
| 6,507,726 B1 | 1/2003 | Atkinson et al. | |
| 6,523,015 B1 | 2/2003 | Bera et al. | |
| 6,894,972 B1 | 5/2005 | Phaal | |
| 7,023,979 B1 | 4/2006 | Wu et al. | |
| 7,219,085 B2 | 5/2007 | Buck et al. | |
| 7,328,218 B2 | 2/2008 | Steinberg et al. | |

(Continued)

FOREIGN PATENT DOCUMENTS

| | | |
|---|---|---|
| DE | 102010046439 | 3/2012 |
| WO | 2012151198 | 11/2012 |
| WO | 2014110167 | 7/2014 |

OTHER PUBLICATIONS

Cabena P. et al., "Intelligent Miner for Data Applications Guide", IBM Corporation, International Technical Support Organization, 1999.*

(Continued)

*Primary Examiner* — Jeffrey A Gaffin
*Assistant Examiner* — Dave Misir
(74) *Attorney, Agent, or Firm* — Kunzler Law Group, PC

(57) ABSTRACT

Apparatuses, systems, methods, and computer program products are disclosed for machine learning results. An input module may receive user input identifying a value for a machine learning parameter. A display module may display one or more machine learning results for the identified machine learning parameter in response to the input module receiving the user input. An update module may dynamically update the displayed one or more machine learning results in response to the input module receiving additional user input identifying an additional value for the machine learning parameter. A pre-compute module may predetermine permutations of the machine learning results prior to the input module receiving the user input.

25 Claims, 14 Drawing Sheets

(56) References Cited

U.S. PATENT DOCUMENTS

| | | | |
|---|---|---|---|
| 7,480,640 B1* | 1/2009 | Elad et al. | 706/14 |
| 7,499,897 B2* | 3/2009 | Pinto et al. | 706/46 |
| 7,600,007 B1 | 10/2009 | Lewis | |
| 7,689,520 B2 | 3/2010 | Burges et al. | |
| 7,814,194 B2 | 10/2010 | Hellerstein et al. | |
| 7,890,929 B1 | 2/2011 | Johanson | |
| 7,996,415 B1 | 8/2011 | Raffill et al. | |
| 8,116,207 B2 | 2/2012 | Schekochikhin et al. | |
| 8,160,981 B2 | 4/2012 | Aparicio, IV | |
| 8,209,271 B1 | 6/2012 | Lin et al. | |
| 8,209,274 B1 | 6/2012 | Lin et al. | |
| 8,214,308 B2 | 7/2012 | Chu | |
| 8,229,864 B1* | 7/2012 | Lin et al. | 706/11 |
| 8,250,009 B1 | 8/2012 | Breckenridge et al. | |
| 8,260,117 B1* | 9/2012 | Xu et al. | 386/262 |
| 8,271,536 B2 | 9/2012 | Amradkar et al. | |
| 8,311,967 B1 | 11/2012 | Lin et al. | |
| 8,370,279 B1 | 2/2013 | Lin et al. | |
| 8,370,280 B1 | 2/2013 | Lin et al. | |
| 8,443,438 B1 | 5/2013 | Sharir et al. | |
| 8,527,324 B2 | 9/2013 | Richter | |
| 8,572,290 B1 | 10/2013 | Mukhopadkyay et al. | |
| 8,880,446 B2 | 11/2014 | Wellman et al. | |
| 8,965,814 B1* | 2/2015 | Rangan | 706/12 |
| 9,081,805 B1 | 7/2015 | Stamen et al. | |
| 2002/0159641 A1 | 10/2002 | Whitney et al. | |
| 2002/0184408 A1 | 12/2002 | Hannigan et al. | |
| 2003/0069869 A1 | 4/2003 | Gronau et al. | |
| 2003/0088425 A1 | 5/2003 | Lam et al. | |
| 2003/0097302 A1 | 5/2003 | Overhultz et al. | |
| 2004/0059966 A1 | 3/2004 | Chan et al. | |
| 2004/0078175 A1 | 4/2004 | Shaw et al. | |
| 2005/0076245 A1 | 4/2005 | Graham et al. | |
| 2005/0090911 A1* | 4/2005 | Ingargiola et al. | 700/36 |
| 2005/0132052 A1 | 6/2005 | Uttamchandani et al. | |
| 2005/0228789 A1 | 10/2005 | Fawcett et al. | |
| 2005/0267913 A1 | 12/2005 | Stienhans et al. | |
| 2005/0278362 A1 | 12/2005 | Maren et al. | |
| 2006/0247973 A1 | 11/2006 | Mueller et al. | |
| 2007/0043690 A1 | 2/2007 | Inakoshi et al. | |
| 2007/0111179 A1 | 5/2007 | Hochwarth et al. | |
| 2007/0112824 A1 | 5/2007 | Lock et al. | |
| 2008/0043617 A1 | 2/2008 | Schekochikhin et al. | |
| 2008/0162487 A1* | 7/2008 | Richter | 707/10 |
| 2008/0168011 A1 | 7/2008 | Steinberg | |
| 2008/0313110 A1 | 12/2008 | Kreamer et al. | |
| 2009/0035733 A1 | 2/2009 | Meitar et al. | |
| 2009/0089078 A1 | 4/2009 | Bursey | |
| 2009/0177646 A1 | 7/2009 | Pham et al. | |
| 2009/0186329 A1 | 7/2009 | Connor | |
| 2009/0222742 A1* | 9/2009 | Pelton et al. | 715/753 |
| 2009/0254379 A1 | 10/2009 | Adams et al. | |
| 2009/0327172 A1 | 12/2009 | Liu et al. | |
| 2010/0009330 A1 | 1/2010 | Yaskin | |
| 2010/0010878 A1* | 1/2010 | Pinto et al. | 705/10 |
| 2010/0010948 A1* | 1/2010 | Ito et al. | 706/20 |
| 2010/0023798 A1 | 1/2010 | Meijer et al. | |
| 2010/0114663 A1 | 5/2010 | Casas et al. | |
| 2010/0131314 A1 | 5/2010 | Ting et al. | |
| 2010/0138026 A1 | 6/2010 | Kaushal et al. | |
| 2010/0145902 A1 | 6/2010 | Boyan et al. | |
| 2010/0223212 A1 | 9/2010 | Manolescu et al. | |
| 2010/0306141 A1 | 12/2010 | Chidlovskii | |
| 2011/0111384 A1 | 5/2011 | Dietrich et al. | |
| 2011/0119300 A1 | 5/2011 | Marcade | |
| 2011/0137672 A1 | 6/2011 | Adams et al. | |
| 2011/0184575 A1 | 7/2011 | Kawamoto et al. | |
| 2011/0265069 A1 | 10/2011 | Fee et al. | |
| 2011/0302153 A1 | 12/2011 | Meretakis et al. | |
| 2011/0307889 A1 | 12/2011 | Moriki et al. | |
| 2012/0004893 A1 | 1/2012 | Vaidyanathan et al. | |
| 2012/0030160 A1 | 2/2012 | Ratnam et al. | |
| 2012/0079134 A1 | 3/2012 | Outhred et al. | |
| 2012/0143995 A1 | 6/2012 | Calvin et al. | |
| 2012/0158620 A1 | 6/2012 | Paquet et al. | |
| 2012/0158624 A1 | 6/2012 | Lingenfelder et al. | |
| 2012/0191630 A1* | 7/2012 | Breckenridge et al. | 706/12 |
| 2012/0191631 A1* | 7/2012 | Breckenridge et al. | 706/12 |
| 2012/0284212 A1 | 11/2012 | Lin et al. | |
| 2012/0284213 A1* | 11/2012 | Lin et al. | 706/12 |
| 2012/0284600 A1 | 11/2012 | Lin et al. | |
| 2012/0330971 A1 | 12/2012 | Thomas et al. | |
| 2013/0004930 A1 | 1/2013 | Sorenson et al. | |
| 2013/0066886 A1 | 3/2013 | Bagchi et al. | |
| 2013/0074091 A1 | 3/2013 | Xavier et al. | |
| 2013/0191257 A1 | 7/2013 | Koodli et al. | |
| 2013/0218042 A1 | 8/2013 | Mardirossian | |
| 2014/0136452 A1 | 5/2014 | Wellman et al. | |
| 2014/0180738 A1* | 6/2014 | Phillipps et al. | 705/7.12 |
| 2014/0195466 A1 | 7/2014 | Phillipps et al. | |
| 2014/0205990 A1* | 7/2014 | Wellman et al. | 434/362 |
| 2014/0236875 A1 | 8/2014 | Phillipps et al. | |
| 2014/0280492 A1 | 9/2014 | Yang et al. | |
| 2014/0358825 A1 | 12/2014 | Phillipps et al. | |
| 2014/0358828 A1 | 12/2014 | Phillipps et al. | |
| 2014/0372346 A1 | 12/2014 | Phillipps et al. | |
| 2014/0372513 A1 | 12/2014 | Jones | |
| 2015/0058266 A1 | 2/2015 | Wellman et al. | |

OTHER PUBLICATIONS

Kolter J. et al., "DynamicWeighted Majority: An Ensemble Method for Drifting Concepts", Journal of Machine Learning Research, 8, 2007, pp. 2755-2790.*

Purpura S. et al., "Statistically adaptive learning for a general class of cost functions (SA L-BFGS)", 2012.*

Frank E. et al., "Weka—A Machine LearningWorkbench for Data Mining", Data Mining and Knowledge Discovery Handbook, 2nd ed., 2010.*

Hall M. et al., "The WEKA Data Mining Software: An Update", SIGKDD Explorations, vol. 11, Issue 1, 2009.*

U.S. Appl. No. 13/870,861, Office Action, Sep. 12, 2013.

Kolter, J. Zico, et al., "Dynamic Weighted Majority: An Ensemble Method for Drifting Concepts", Journal of Machine Learning Research 8, 2007, pp. 2755-2790.

Application No. PCT/US2013/077236, International Search Report and Written Opinion, Feb. 24, 2014.

Application No. PCT/US14/42104, International Search Report and Written Opinion, Dec. 17, 2014.

U.S. Appl. No. 13/749,618, Office Action, Dec. 22, 2014.

Cabena, et al., "Intelligent Miner for Data Applications Guide", IBM, 1998, pp. 89-103.

U.S. Appl. No. 13/725,995, Office Action, Apr. 2, 2015.

Ilijasic, Lovro, "Computational Grids as Complex Networks", Torino, 2010.

"HP Process Resource Manager User's Guide", Hewlett-Packard Development Company, Version C.03.05, Jan. 2009.

U.S. Appl. No. 13/749,618, Office Action, Jul. 8, 2014.

Application No. PCT/US14/10729, International Search Report and Written Opinion, Aug. 28, 2014.

Application No. PCT/US14/39859, International Search Report and Written Opinion, Oct. 16, 2014.

Application No. PCT/US14/39861, International Search Report and Written Opinion, Oct. 16, 2014.

Application No. PCT/US14/42754, International Search Report and Written Opinion, Oct. 15, 2014.

U.S. Appl. No. 13/870,861, Notice of Allowance, Jun. 20, 2014.

Bennett, Casey C., "EHRs Connect Research and Practice: Where Predictive Modeling, Artificial Intelligence, and Clinical Decision Support Intersect", Health Policy and Technology (2012), pp. 24.

McTigue, Jake, "Predictive Analytics for IT", Information Week, Mar. 2012, pp. 17.

Purpura, Stephen, "Statistically Adaptive Learning for a General Class of Cost Functions (SA L-BFGS)", Sep. 5, 2012, pp. 7, arXiv:1209.0029v3 [cs.LG].

Application No. PCT/US2014/013028, International Search Report and Written Opinion, May 15, 2014.

U.S. Appl. No. 13/870,861, Office Action, Apr. 8, 2014.

Application No. PCT/US2013/070358, International Search Report and Written Opinion, Feb. 28, 2014.

(56) References Cited

OTHER PUBLICATIONS

Steinberg, Dan, "CART 6.0", Salford Systems, 2006, pp. 440, www.salford-systems, com.

"SPM Features", Salford Systems—Data Mining and Predictive Analytics Software, downloaded Apr. 30, 2015, pp. 5, https://www.walford-systems, com/products/spm-features.

Application No. PCT/US2013/070358, International Preliminary Report on Patentability, May 28, 2015.

U.S. Appl. No. 14/014,322, Office Action, Aug. 27, 2015.

U.S. Appl. No. 13/725,995, Office Action, Sep. 24, 2015.

Ilijasic, Lovro, "Computational Grids as Complex Networks", Torino, pp. 130, 2010.

"HP Process Resource Manager User's Guide Version C.03.05", Hewlett-Packard Development Company, pp. 111, Jan. 2009.

U.S. Appl. No. 14/531,893, Office Action, Sep. 25, 2015.

Kolter, J. Zico, "Dynamic Weighted Majority: An Ensemble Method for Drifting Concepts", Journal of Machine Learning Research, pp. 36, Dec. 2007.

PCT/US2013/077236, International Preliminary Report on Patentability, Jul. 2, 2015.

PCT/US2014/013028, International Preliminary Report on Patentability, Aug. 6, 2015.

PCT/US2014/010729, International Preliminary Report on Patentability, Jul. 23, 2015.

* cited by examiner

| | Goal<br>122 | Feature 1<br>124 | Feature 2<br>126 | Action<br>128 | Target<br>130 | Confidence<br>132 |
|---|---|---|---|---|---|---|
| 134a | Double Sales | 22313 | 18-25 yrs | 20% Off | bob@email.com | 74% |
| 134n | Repeat Buy | $12,000 | 683,174 | BOGO Email | sue@email.com | 62% |

FIG. 1B

USER INTERFACE FOR MACHINE LEARNING

TECHNICAL FIELD

The present disclosure, in various embodiments, relates to machine learning and more particularly relates to a dynamic user interface for machine learning results.

BACKGROUND

Machine learning predictions or other machine learning analyses are often represented as static numbers, which may be interpreted by a Data Scientist or other expert. Raw machine learning data can be confusing and inaccessible, and may hold little meaning for a lay person attempting to interpret the data.

For example, a business person, sales person, or the like may use machine learning to predict business actions or outcomes. However, a static machine learning prediction may hold little if any significance, and may be difficult to apply in practice.

Further, a machine learning prediction is typically made with certain parameters or inputs, and may take substantial time to calculate or determine. If a user, such as the business person or sales person from the previous example, would like to change a parameter or input, a substantial delay will occur before a new machine learning prediction is available.

SUMMARY

From the foregoing discussion, it should be apparent that a need exists for an apparatus, system, and method to provide an accessible user interface for machine learning results. Beneficially, such an apparatus, system, and method would dynamically update and display machine learning results during runtime, with little or no delay.

The present disclosure has been developed in response to the present state of the art, and in particular, in response to the problems and needs in the art that have not yet been fully solved by currently available machine learning methods. Accordingly, the present disclosure has been developed to provide an apparatus, system, and method for machine learning results that overcome many or all of the above-discussed shortcomings in the art.

Apparatuses are presented for machine learning results. In one embodiment, an input module is configured to receive user input identifying one or more values for one or more machine learning parameters. In a further embodiment, a display module is configured to display one or more machine learning results for one or more identified machine learning parameters in response to an input module receiving user input. One or more machine learning results, in certain embodiments, are determined using machine learning and an identified machine learning parameter. In another embodiment, an update module is configured to dynamically update one or more displayed machine learning results in response to an input module receiving additional user input identifying one or more additional values for one or more machine learning parameters.

Methods are presented for machine learning results. In one embodiment, a method includes inputting permutations of machine learning parameters incrementally between minimum values for the machine learning parameters and maximum values for the machine learning parameters into a predictive program. In a further embodiment, a method includes determining machine learning results from a predictive program for input permutations of machine learning parameters. A method, in another embodiment, includes populating a results data structure with determined machine learning results indexed by machine learning parameters.

Systems for machine learning results are presented. In one embodiment, a pre-compute module is configured to predetermine, using one or more predictive programs, permutations of machine learning results for each of the one or more predictive programs at predefined increments between minimum values for machine learning parameters and maximum values for the machine learning parameters. An input module, in certain embodiments, is configured to receive user input from multiple users identifying values for one or more machine learning parameters for one or more predictive programs. A display module, in a further embodiment, is configured to display one or more predetermined machine learning results to multiple users based on identified values.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. The disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which:

FIG. 1B is a schematic block diagram illustrating one embodiment of a graphical display for machine learning results;

DETAILED DESCRIPTION

Figure 1A:
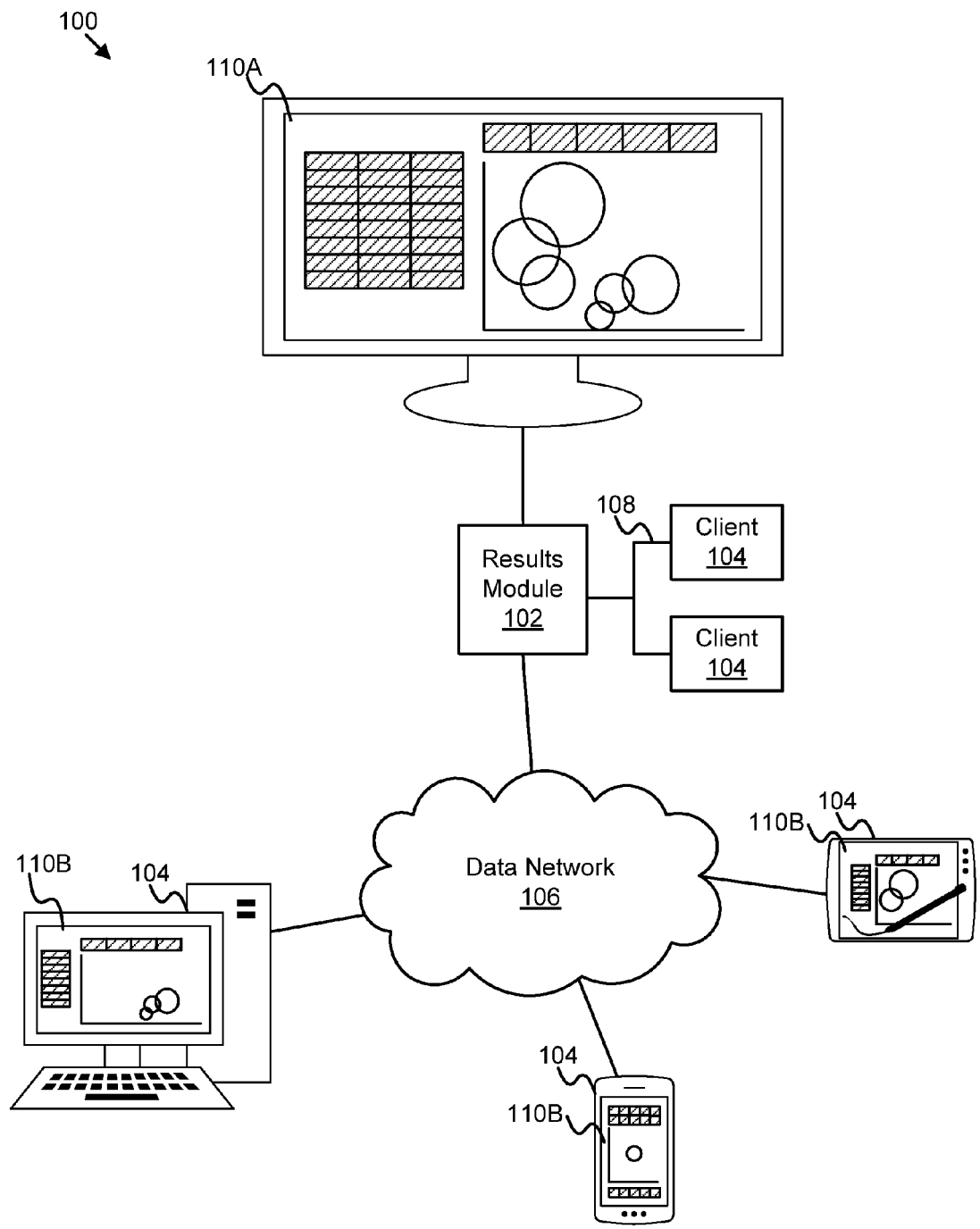
FIG. 1A is a schematic block diagram illustrating one embodiment of a system for machine learning results.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

FIG. 1A depicts one embodiment of a system 100 for machine learning results. The system 100, in the depicted embodiment, includes one or more results modules 102. A results module 102 may be in communication with several clients 104, other results modules 102, or the like over a data network 106, over a local channel 108 such as a system bus, an application programming interface (API), or the like. A results module 102 may display various machine learning results on one or more electronic display devices 110 to one or more users or other clients 104. A client 104 may comprise a software application, a user, a hardware computing device with a processor and memory, or another entity in communication with a results module 102.

In general, a results module 102 dynamically displays or otherwise presents machine learning results using a user interface for one or more users or other clients 104. As used herein, a user interface may include a graphical user interface (GUI), a command line interface, an auditory or verbal interface, a tactile or touch interface, or another human-machine interface allowing input and/or output between a user and the results module 102, through a computing device such as a client 104 or the like. The one or more results modules 102, in certain embodiments, may display machine learning results graphically on one or more electronic display devices 110, such as a liquid crystal display (LCD) device, light emitting diode (LED) display device, a plasma display device, an electronic ink display device, a television, a computer monitor, a mobile device screen such as a mobile phone or tablet screen, a projector, and/or another electronic display device 110. An electronic display device 110 may also comprise a touchscreen or other input device, allowing a user to directly manipulate machine learning inputs or results for the one or more results modules 102. In certain embodiments, a computing device or other client 104 may include one or more user input devices, such as a mouse, a keyboard, a touchpad, a microphone, a camera, an accelerometer, or the like allowing a user to provide user input to a results module 102.

In certain embodiments, the results module 102 provides and/or accesses a machine learning framework allowing the results module 102 and/or clients 104 to request machine learning ensembles, to make analysis requests, and to receive machine learning results, such as a classification, a confidence metric, an inferred function, a regression function, an answer, a prediction, a recognized pattern, a rule, a recommendation, or other results. Machine learning, as used herein, comprises one or more modules, computer executable program code, logic hardware, and/or other entities configured to learn from or train on input data, and to apply the learning or training to provide results or analysis for subsequent data. Machine learning and generating machine learning ensembles or other machine learning program code is described in greater detail below with regard to FIG. 3 through FIG. 8.

The results module 102, in one embodiment, comprises a machine learning simulator or pre-cache configured to pre-determine, pre-compute, and/or cache machine learning results in a results data structure, so that the results module 102 may dynamically display different permutations of the machine learning results in response to user input from a client 104 or otherwise dynamically access machine learning results. The results module 102, in a further embodiment, provides a graphical user interface to engage the pre-determined and/or simulated machine learning results in a visual form.

As described above, machine learning results that are represented as static numbers can be confusing and difficult to understand. Machine learning may also receive large amounts of data as input for processing, and the machine learning inputs may be equally complex and daunting for a lay person to interpret or manipulate. To overcome or minimize these shortcomings, the one or more results modules 102, in certain embodiments, may use a cognitive, visual model to provide meaning to machine learning inputs, results, and/or other parameters. The one or more results modules 102 may allow dynamic manipulation of one or more machine learning inputs, results, and/or other parameters and may dynamically update a display (or other presentation) of other related machine learning inputs, results, and/or other parameters in at or near real-time, so that the machine learning inputs, results, and/or other parameters are interactive.

For example, the one or more results modules 102 may present machine learning inputs, results, and/or other parameters for a business to a business person, sales person, or another user to predict business actions or outcomes, provide business recommendations, or the like. Because, in certain embodiments, the one or more results modules 102 present the machine learning inputs, results, and/or other parameters in a dynamic, experiential manner, using an interactive data visualization or the like, the one or more results modules 102 may facilitate understanding of the meaning of the presented data, without burdening the user with the minutia and complexity of the literal underlying data. The one or more results modules 102 may present machine learning inputs, results, predictions, and/or other parameters in a manner that communicates business meaning to a user, allowing the user to navigate and recognize patterns in enterprise data, thereby determining optimal actions for the business.

In order to dynamically display or otherwise present updated machine learning results or other parameters to a user at or near real-time, in certain embodiments, the one or more results modules 102 may pre-compute, pre-determine, and/or pre-cache different permutations of the machine learning results and/or other parameters. Pre-computing each permutation of machine learning results, indexed by machine learning input parameters, in certain embodiments, allows the one or more results modules 102 to dynamically update displayed machine learning results and/or other parameters with little or no delay in response to receiving input from a user or other client 104, without having to process new machine learning inputs for each user input.

The one or more results modules 102 may use machine learning, such as the machine learning ensembles or other machine learning program code described below to generate a plurality of predictive outcomes or other machine learning results from a data set that is comprised of a plurality of instances (e.g., rows) and a plurality of actions (e.g., features, attributes, and/or columns). By using historical customer data sets to understand the interaction between the various actions, the one or more results modules 102 may achieve a level of confidence in using the historical data to generate patterns to predict future events, recommended actions, or the like using machine learning.

The one or more results modules 102 may process each instance within the data set to generate a new set of predictive metrics (e.g., machine learning results). The one or more results modules 102 may perform this processing of data iteratively for each instance, deriving a new set of predictive metrics or other machine learning results for each iteration. The accumulation of each of the predictive metrics or machine learning results gathered after processing each of the different instances by the one or more results modules 102 may populate a table or other results data structure of predictive, machine learning information (e.g., machine learning inputs, machine learning results, and/or other machine learning parameters) that is pre-processed and readily accessible by the one or more results modules 102 for presentation to a user with direct correlation between the various actions.

The table or other results data structure may include up to millions of predictions or other machine learning results. This table or other results data structure may accommodate user interaction with the predictive metrics presented by the one or more results modules 102 in a substantially real-time manner.

The results module 102, in certain embodiments, provides a user interface that is an interactive, visual representation of the pre-computed, pre-cached machine learning data, using a visual method to define a goal or the like. This may facilitate the ability of a user to see a simulation or representation of any possible action as they relate to a goal, based on pre-computed machine learning processing of the associated data. For example, the one or more results modules 102 may enable a user to evaluate any number of actions in real-time, substantially instantaneously—as it relates to that goal and their interplay across a massively large number of possible actions. The one or more results modules 102 may allow a user to move or adjust any one feature and watch the other variables dynamically update and change (e.g., interplay).

Instead of using static graphs or tables to display historical information, things that have already occurred and that are by nature, static or fixed (since the past cannot be changed), the one or more results modules 102 may dynamically display and update outcomes or results by showing a user what actions are recommended to obtain a desired result or goal, while allowing the user to update or change input parameters, results, and/or goals in real-time. The output of the one or more results modules 102 may be the generation of a discrete action list or action plan. An action plan may include one or more steps or actions a user may take in order to achieve the desired results or goal, a list of recommended targets for an action, or the like. A user may define a desired result or goal by directly adjusting or selecting an action, and the one or more results modules 102 may display or otherwise present the interplay between other metrics and their predicted outcomes or results as well as a final list of actions recommended to accomplish such results.

In certain embodiments, the one or more results modules 102 may provide an interactive graphical user interface that dynamically displays and adjusts an action plan, indicating the recommended work and resources to achieve a specific goal or desired outcome. In one embodiment, the graphical user interface of the one or more results modules 102 may include a dynamic graph with multiple circles or other objects, where each circle or other object represents an action or result. The one or more results modules 102 may allow a user to move the result objects around the graph, re-size the objects by stretching or pinching, or otherwise manipulate or adjust the objects. For example, in certain embodiments, an x-axis may represent time; a y-axis may represent cost, investment, man-hours, resources, or the like; a size of an object may represent a size or reach of results or targets; opacity, color, or shading of an object may represent A confidence metric for a prediction or recommendation; opacity, color, or shading of an object may represent a target list recommended for the associated action; or the like.

By moving the target circle or other object around the graph, in one embodiment, the opacity or other representation of confidence for corresponding objects will change based on its placement on the graph. Corresponding circles or other objects may also change in appearance (e.g., size, location, opacity, color, or the like) based on a user's placement of an original, target circle or other object on the graph. In certain graphs or other graphical user interfaces of the one or more results modules 102, a user may be allowed to adjust a value for an overall goal.

The one or more results modules 102 may use a movement, re-sizing, or other adjustment of the circles or other objects on the graph is an input to a results data structure to update the positions and sizes of other objects on the graph, other attributes of the adjusted object, or the like. In certain embodiments, a user may set one more results or goals to their desired outcomes or states, and the one or more results modules 102 may present what is recommended, in terms of actions, to accomplish the desired outcomes or states using the pre-computed or pre-cached machine learning results. Once the results, goals, or other parameters are set by a user, the presented action list may indicate to the user what actions to take, how many times to take an action, when to take an action, one or more targets of an action, or the like.

The one or more results modules 102 may present a graphical user interface that allows a user or other client 104 to manipulate its content, in an interactive manner, in order to simulate pre-computed machine learning results, which may dictate a specific list of actions required to obtain a goal or desired outcome. A graphical user interface, as used herein, may include displayed visual objects as described above, a spreadsheet or table with numerical values (e.g., modifying cell contents for a particular action to see an effect on other cells, an action list, or the like).

In certain embodiments, the one or more results modules 102 may allow a user to specify or adjust an action and see the action's predicted outcome or effect on a goal. A user may specify a desired goal value and see the machine learning predicted actions required to achieve that goal, based on a previously computed machine learning analysis of the user's data. A user, in certain embodiments, may specify a confidence metric or the like and the one or more results modules 102 may present one or more actions, attributes, features, goals, or the like that have a highest correlation to or impact on the confidence metric, based on the pre-computed or pre-cached machine learning results. A user, in one embodiment, may directly manipulate a graphical object representing a goal, for example a familiar business graph such as a line chart, and see a graphical representation of the actions predicted to have the greatest effect on achieving the goal. The results module 102 may present such controls graphically or in another manner.

In one embodiment, the one or more results modules 102 may provide a dynamic interface for predictive analytics. Predictive analytics is the study of past performance, or patterns, found in historical and transactional data to identify behavior and trends in future events, using machine learning or the like. This may be accomplished using a variety of statistical techniques including modeling, machine learning, data mining, or the like.

One term for large, complex, historical data sets is Big Data. Examples of Big Data include web logs, social networks, blogs, system log files, call logs, customer data, user feedback, or the like. These data sets may often be so large and complex that they are awkward and difficult to work with using traditional tools. With technological advances in computing resources, including memory, storage, and computational power, along with frameworks and programming models for data-intensive distributed applications, the ability to collect, analyze and mine these huge repositories of structured, unstructured, and/or semi-structured data has only recently become possible.

In certain embodiments, prediction may be applied through at least two general techniques: Regression and Classification.

Regression models attempt to fit a mathematical equation to approximate the relationship between the variables being analyzed. These models may include "Discrete Choice" models such as Logistic Regression, Multinomial Logistic Regression, Probit Regression, or the like. When factoring in time, Time Series models may be used, such as Auto Regression—AR, Moving Average—MA, ARMA, AR Conditional Heteroskedasticity—ARCH, Generalized ARCH—GARCH and Vector AR—VAR). Other models include Survival or Duration analysis, Classification and Regression Trees (CART), Multivariate Adaptive Regression Splines (MARS), and the like.

Classification is a form of artificial intelligence that uses computational power to execute complex algorithms in an effort to emulate human cognition. One underlying problem, however, remains: determining the set of all possible behaviors given all possible inputs is much too large to be included in a set of observed examples. Classification methods may include Neural Networks, Radial Basis Functions, Support Vector Machines, Naïve Bayes, k-Nearest Neighbors, Geospatial Predictive modeling, and the like.

Each of these forms of modeling make assumptions about the data set and model the given data, however, some models are more accurate than others and none of the models are ideal. Historically, using predictive analytics or other machine learning tools was a cumbersome and difficult process, often involving the engagement of a Data Scientist or other expert. Any easier-to-use tools or interfaces for general business users, however, typically fall short in that they still require "heavy lifting" by IT personnel in order to present and massage data and results. A Data Scientist typically must determine the optimal class of learning machines that would be the most applicable for a given data set, and rigorously test the selected hypothesis by first fine-tuning the learning machine parameters and second by evaluating results fed by trained data.

The results module 102, in certain embodiments, generates machine learning ensembles or other machine learning program code for the clients 104, with little or no input from a Data Scientist or other expert, by generating a large number of learned functions from multiple different classes, evaluating, combining, and/or extending the learned functions, synthesizing selected learned functions, and organizing the synthesized learned functions into a machine learning ensemble. The results module 102, in one embodiment, services analysis requests for the clients 104 using the generated machine learning ensembles or other machine learning program code.

By generating a large number of learned functions, without regard to the effectiveness of the generated learned functions, without prior knowledge of the generated learned functions suitability, or the like, and evaluating the generated learned functions, in certain embodiments, the results module 102 may provide machine learning ensembles or other machine learning program code that are customized and finely tuned for a particular machine learning application, data from a specific client 104, or the like, without excessive intervention or fine-tuning. The results module 102, in a further embodiment, may generate and evaluate a large number of learned functions using parallel computing on multiple processors, such as a massively parallel processing (MPP) system or the like. Machine learning ensembles or other machine learning program code are described in greater detail below with regard to FIG. 2B, FIG. 3, FIG. 4, and FIG. 5.

The results module 102 may service machine learning requests to clients 104 locally, executing on the same host computing device as the results module 102, by providing an API to clients 104, receiving function calls from clients 104, providing a hardware command interface to clients 104, or otherwise providing a local channel 108 to clients 104. In a further embodiment, the results module 102 may service machine learning requests to clients 104 over a data network 106, such as a local area network (LAN), a wide area network (WAN) such as the Internet as a cloud service, a wireless network, a wired network, or another data network 106.

In the system 100 of FIG. 1A, a plurality of results modules 102 are depicted in a collaborative configuration. One or more results modules 102 may operate in a collaborative configuration on a single computing device or client 104 (e.g., receiving user input and presenting machine learning results and/or other parameters to multiple users on a single device) or on multiple computing devices or clients 104 (e.g., receiving user input and presenting machine learning results and/or other parameters to multiple users on multiple devices) as illustrated in the depicted embodiment. In other embodiments, the system 100 may include a single results module 102 operating on a single computing device, with or without a data network 106 and other clients 104.

In the depicted embodiment, the results modules 102 are in communication over the data network 106 to display or otherwise present machine learning results to multiple users using electronic display devices 110 of different client computing devices 104, such as the depicted desktop computer, mobile phone, and tablet devices. In the depicted embodiment, one result module 102A (e.g., a central, primary, server, or master results module 102) displays collaborative group machine learning results on a first electronic display device 110A, based on user input such as object manipulations from several different users or client devices 104, while several additional results modules 102B (e.g., secondary, client, follower results modules 102B) display copies of the machine learning results, subsets of the machine learning results, or other machine learning parameters on client electronic display devices 110B.

Different client devices 104, in the depicted embodiment, display different subsets of the machine learning results or other parameters, which may include the input and/or output of different machine learning ensembles or other machine learning program code. For example, the results modules 102 may be used in a business meeting, a boardroom, or the like, with representatives from different departments or business units each viewing and manipulating separate machine learning inputs, results, and/or other parameters for machine learning ensembles or other machine learning program code generated specifically for their respective departments or business units, using enterprise data from the different departments or business units.

In a collaborative environment, the one or more results modules 102 may display or otherwise present, on a primary electronic display device 110A or one or more secondary electronic display devices 110B, an impact that an adjustment or manipulation of a machine learning input, result, and/or other parameter made by one user or other client 104 has on displayed machine learning results for another user or other client 104, based on different machine learning ensembles or other program code. For example, a user in a shipping department of a business may use a user interface of a results module 102 to propose a policy change, such as a change in shipping providers, a change in shipping dates, or the like. The one or more results modules 102 may display or otherwise present an impact of the proposed change of the shipping department to users from other departments, such as a customer service department, a sales department, an information technology (IT) department, or the like. In the example, a proposal to no longer ship orders on weekends may increase a number of complaints to a customer service department, decrease an effectiveness of an advertising campaign of a sales department, or the like and the one or more results modules 102 may display/present these impacts or other effects to one or more users on one or more electronic display devices 110.

FIG. 1B depicts one embodiment of a graphical display 120 provided by a results module 102. In the depicted embodiment, the graphical display 120 comprises a graphical table such as a spreadsheet that displays data values in rows 134a-n and columns 122, 124, 126, 128, 130, 132. The columns 122, 124, 126, 128, 130, 132, in the depicted embodiment, include inputs and outputs (e.g., parameters and/or results) for machine learning, such as a machine learning ensemble or other machine learning program code, such as the depicted goal 122, first feature 124, second feature 126, action 128, target 130, and confidence metric 132 for each of a first instance 134a and a second instance 134n (e.g., rows A-N). A results module 202 may provide the graphical display 120, and monitor the graphical display 120 for user input. In response to a user entering, changing, and/or updating a data value for an entry in the table of the graphical display 120, a results module 202 may update other entries in the table according to the data value provided by the user, using machine learning, such as the pre-computed and/or pre-cached machine learning results described below with regard to the pre-compute module 208.

A data value in an entry for a column 122, 124, 126, 128, 130, 132 or feature may comprise an attribute. Each column 122, 124, 126, 128, 130, 132 or feature may be associated with or support a plurality of attributes, defined by minimum and maximum values, data types (e.g., string, integer, boolean, character, float, or the like), a set of defined values, or another set of attribute values. In certain embodiments, the supported attribute values for a column 122, 124, 126, 128, 130, 132 or feature may depend on a selected goal 122.

For example, in the depicted embodiment, the supported attributes or values for the features 124, 126 vary based on the selected goal 122, with the first feature 124 of the first instance 134a comprising a zip code (e.g., a customer zip code, a store zip code), the second feature 126 comprising an age group (e.g., a customer age group, a target age group), the first feature 124 of the second instance 134n comprising a dollar amount (e.g., a purchase amount, a profit amount, a goal amount, an action cost, a budget), and the second feature 126 of the second instance 134n comprising an integer value (e.g., a target group size, a number of sales, a number of actions).

In the depicted embodiment, the goals 122 comprise business goals or desired outcomes, including goals 122 to double sales or to increase repeat purchases. A goal 122, as used herein, may include a desired, intended, or selected outcome or result of one or more actions or, action plans, or other events. A goal 122 may include a business goal (e.g., a sales goal, a marketing goal, a corporate goal, an IT goal, a customer service goal, or the like) a personal goal, a medical goal, a fitness goal, a political goal, an organization goal, a team goal, an economic goal, a short-term goal, a long-term goal, a custom goal, a predefined goal, or another type of goal, based on a context in which the one or more results modules 102 operate.

In one embodiment, a goal 122 may be associated with a machine learning ensemble or other machine learning program code. For example, each supported goal 122 may be associated with or represent a different generated machine learning ensemble, a different set of multiple machine learning ensembles, or the like. The machine learning module 212, as described below, may generate machine learning ensembles or other machine learning program code for different goals 122 based on a user or organization's own data, so that the one or more results modules 102 may also display machine learning results customized and determined based on a user or organization's own historical data, customer data, or the like.

The one or more results modules 102, in certain embodiments, may allow a user to adjust, change, or customize data entries for a goal 122, a feature 124, 126, an action 128, a target 130, and/or a confidence metric 132 for one or more of the instances 134a-n. In one embodiment, a results module 102 may support user input for a single column 122, 124, 126, 128, 130, 132 at a time per instance 134a-n, and may determine and display associated machine learning parameters/results for the other columns 122, 124, 126, 128, 130, 132. In a further embodiment, a results module 102 may support user input for up to all but one of the columns 122, 124, 126, 128, 130, 132 at a time per instance 134a-n, and may determine and display associated machine learning parameters/results for the one or more other columns 122, 124, 126, 128, 130, 132.

For example, in one embodiment, a user may select a goal 122 for an instance 134a-n, may input a data value for one or more features 124, 126, and the results module 102 may determine and dynamically display a recommended action 128 to achieve the goal 122, one or more targets 130 for the recommended action 128, and a confidence metric 132 representing a likelihood that the recommended action 128 for the one or more targets 130 will yield the associated goal 122. In the depicted embodiment, the results module 102 has determined, using a results data structure or other machine learning, has determined and displayed a first instance 134a, indicating that to achieve a goal 122 of doubling sales for 18-25 year olds 126 in the 22313 zip code 124, a user should perform an action 128 of offering a 20% off discount to a set of target 130 customers (indicated by the depicted drop-down list) including "bob@email.com" and that the recommended action 128 has been determined to have a 74% likelihood of success 132.

For the second instance 134n, in the depicted embodiment, the results module 102 has determined and displayed that to achieve a goal 122 of creating or increasing repeat buys for a total 124 of $12,000 additional sales, a user should send a buy-one-get-one (BOGO) free email 128 to a target set 130 of 683,174 people 126 (e.g., from a customer list and/or database), including "sue@email.com" and others indicated by the depicted drop-down list, and that the recommended action 128 has an associated confidence metric 132 of 62%. The depicted instances 134a-n and features 122, 124, 126, 128, 130, 132 of FIG. 1B are for purposes of illustration only, and other embodiments may include different presentations and arrangements of machine learning inputs, outputs, results, and/or other parameters.

In this manner, the one or more results modules 102 may provide a spreadsheet or other table populated with machine learning inputs, outputs, results, and/or other parameters and dynamically update the displayed parameters as a user provides user input changing, updating, or adding data values for displayed parameters in the spreadsheet or other table. In certain embodiments, the one or more results modules 102 may update displayed parameters substantially in real-time, using pre-computed or pre-cached machine learning inputs, outputs, results, and/or other parameters, thereby providing an interactive data visualization for machine learning. The one or more results modules 102 may display machine learning inputs, outputs, results, and/or other parameters based on a user's own data, enabling the user to visualize patterns and relationships and to determine actions and goals based on the patterns and relationships.

Figure 1C:
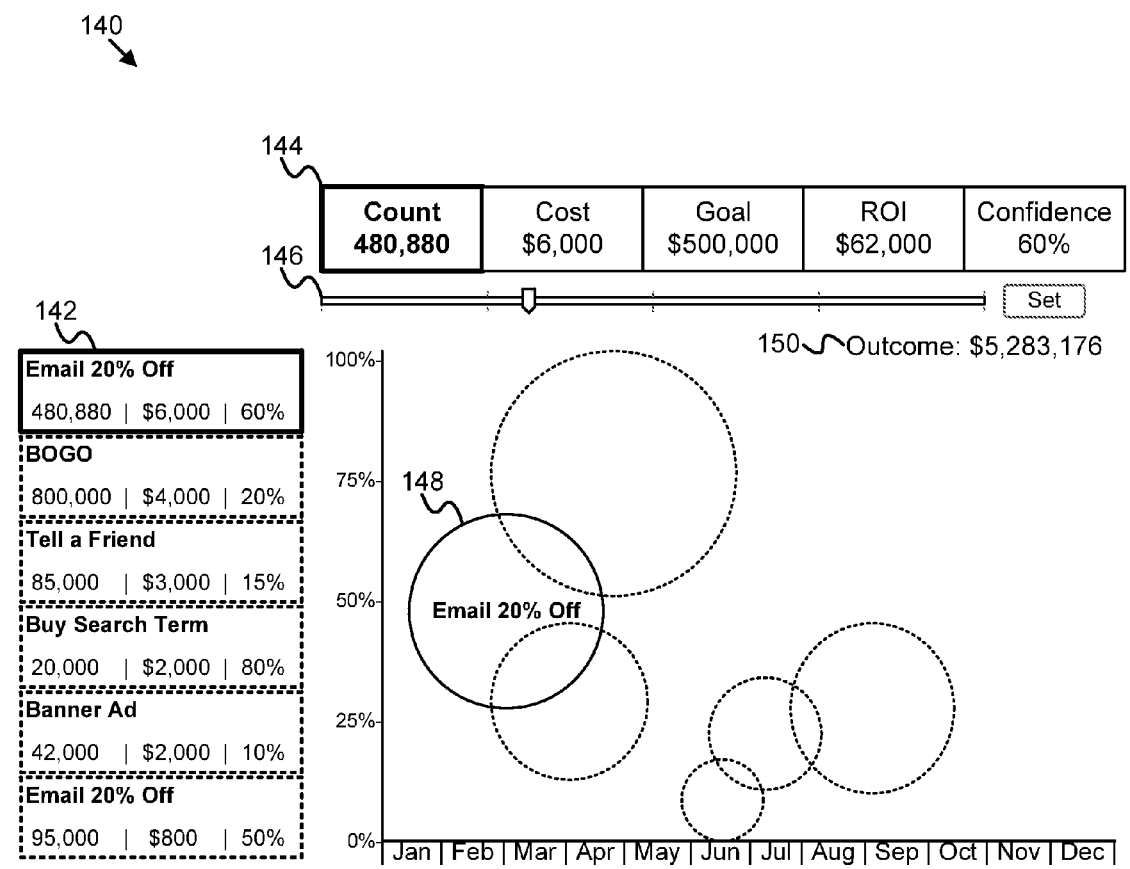
FIG. 1C is a schematic block diagram illustrating a further embodiment of a graphical display for machine learning results.

FIG. 1C depicts another embodiment of a graphical display 130 provided by the results module 102. In the depicted embodiment, the one or more results modules 102 display machine learning inputs, results, and/or other parameters as objects 148, such as the displayed circles. In other embodiments, the one or more results modules 102 may display machine learning inputs, results, and/or other parameters as one or more other geometric shapes (e.g., squares, triangles, rectangles, ovals, stars, or the like); as a graphical metaphor or image for a user, a business, or a product (e.g., an icon, a logo, a product image, or the like); and/or as a dynamic interactive graph, chart, or plot (e.g., a pie chart, bar chart, histogram, line chart, tree chart, scatter plot, or the like) that dynamically reform or readjust with new values for machine learning inputs, results, and/or other parameters based on user input.

In the depicted embodiment, the one or more results modules 102 display a plurality of actions 142, each with associated machine learning parameters 144, an overall goal 150 or outcome 150, and a displayed object 148. An action 142 of "email 20% off" is selected in the depicted embodiment, with machine learning parameters 144 including an action count (e.g., size of a target set) of 480,880, a cost of $6,000 for performing the action, a goal revenue of $500,000, a return on investment (ROI) of $62,000, and a confidence metric of 60%. In the depicted embodiment, the "count" machine learning parameter 144 is selected, and a slider 146 graphical user interface element corresponding to the machine learning parameter 144 is displayed, allowing a user to adjust the "count" machine learning parameter 144, changing the value from 480,880 to a different value. In other embodiments, a text box, one or more radio buttons, a dropdown list, checkboxes, or other graphical user interface elements may be used to receive user input adjusting a machine learning parameter 144. In one embodiment, the one or more results modules 102 may dynamically display a slider 146 or another graphical user interface element for whichever action 142 and/or machine learning parameter 144 is currently selected or active (circumscribed with bold lines in the depicted embodiment).

In the depicted embodiment, the one or more results modules 142 displays a plurality of actions 142, that when taken, are predicted to cumulatively accomplish the goal 150 or outcome 150, based on a machine learning analysis. In other embodiments, the one or more results modules 102 may recommend a single action 142 for a goal 150, predict multiple outcomes 150 or goals 150 for a single action 142, or the like.

In one embodiment, the one or more results modules 102 may receive user input as user manipulation of a displayed object 148, such as an adjustment to a size of the displayed object 148, an adjustment to a vertical position of the displayed object 148, an adjustment to a horizontal position of the displayed object 148, an adjustment to an opacity of the displayed object 148, an adjustment to a color of the displayed object 148, an adjustment to a shape of displayed object 148, an adjustment to shading of displayed object 148, a text entry in a text box for the displayed object 148, user interaction with an animation for the displayed object 148, or the like.

Supported manipulations to a displayed object 148, in the depicted embodiment, are each associated with a machine learning parameter 144 and each different object 148 is associated with a different action 142. For example, a size of a displayed object 148 may correspond to a size of a result set or target count for a machine learning parameter 144, a vertical position (e.g., relative to the percentage scale of the Y axis) of a displayed object 148 may correspond to an action count for a machine learning parameter 144 or the like, a horizontal position (e.g., relative to the time scale of the X axis) of a displayed object 148 may correspond to an execution time or date for a machine learning parameter 144 such as an action 142 or the like, an opacity, color, shading, and/or border of a displayed object 142 may correspond to a confidence metric for a machine learning parameter 144 or the like.

In embodiments where an electronic display device 110 comprises a touchscreen or other touch interface, direct touch manipulation of a displayed object 148 (or mouse or keyboard manipulation, in embodiments without a touch interface) may provide a user with an experiential understanding of the user's data and associated machine learning results, predictions, and/or recommendations, to a greater degree than may otherwise be possible with a static list of numbers.

The one or more results modules 102 may dynamically update the displayed actions 142, the displayed machine learning parameters 144, and/or the displayed goal 150 or outcome in response to user input manipulating or adjusting one of the values 142, 144, 148, 150. For example, if a user changes a value for a count, cost, goal, ROI, confidence, or other attribute/machine learning parameter 144, such as decreasing the displayed action count 144 for the "email 20% off" action, a results module 102 may update attributes/machine learning parameters for other actions 142, such as increasing action counts for one or more other actions 142, in an optimal machine learning manner, to satisfy the goal 150 or outcome.

While a single screen view is illustrated in the depicted embodiment, in certain embodiments, in response to double clicking, right clicking, touching and holding, or another predefined user input to a graphical user interface element, the one or more results modules 102 may display another screen view, with additional information regarding a machine learning parameter 144, an action 142, a displayed object 148, or the like. For example, the one or more results modules 102 may display a target list for one or more actions 142, an action plan, or the like. In certain embodiments, the one or more results modules 102 may display or provide an export button or other graphical user interface element, and may export a target list, an action plan, and/or other information in a different format (e.g., text document, PDF, email, database file, spreadsheet, or the like) in response to user input.

Figure 2A:
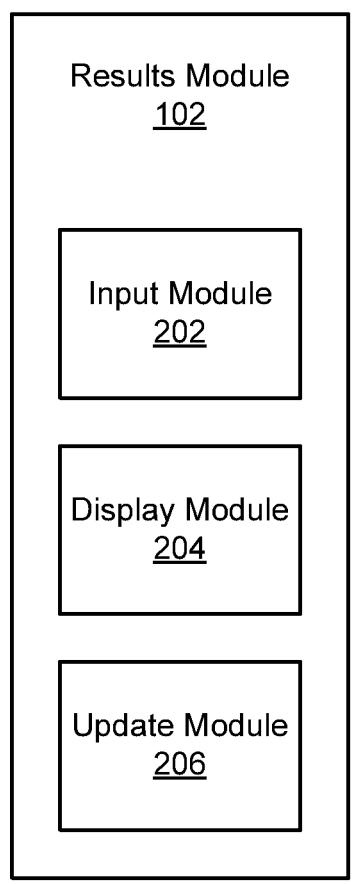
FIG. 2A is a schematic block diagram illustrating one embodiment of a results module.

FIG. 2A depicts another embodiment of the results module 102. In the depicted embodiment, the results module 102 includes an input module 202, a display module 204, and an update module 206.

In one embodiment, the input module 202 is configured to receive user input identifying a value for a machine learning parameter. A machine learning parameter, as used herein, may include an input for machine learning (e.g., an instance for one or more features, an attribute for a feature, user workload data, business data, customer data, enterprise data, or the like), an output for machine learning (e.g., a result, a classification, a confidence metric, an inferred function, a regression function, an answer, a prediction, a recognized pattern, a rule, a recommendation, an evaluation, an action, or the like), a goal or action for which specific machine learning was generated, or another data value associated with machine learning.

The input module 202, in a further embodiment, may receive user input as an adjustment to a slider graphical user interface element corresponding to the machine learning parameter, as a user entry in a graphical table, as a user manipulation of a displayed object, or using another graphical user interface element. For example, the user input may include an adjustment to a size of a displayed object, where the size of the displayed object corresponds to a size of a result set for a machine learning parameter, or the like; an adjustment to a vertical position of a displayed object where the vertical position corresponds to an action count for a machine learning parameter, or the like; an adjustment to a horizontal position of a displayed object where the horizontal position corresponds to a time for a machine learning parameter, or the like; and/or an adjustment to an opacity of a displayed object where the opacity corresponds to a confidence metric for a machine learning parameter an adjustment to a color of a displayed object, an adjustment to a shape of a displayed object, an adjustment to shading of a displayed object, a text entry in a text box for a displayed object, user interaction with an animation for a displayed object, or the like.

In certain embodiments, the input module 202 is configured to receive user input from multiple users (e.g., clients 104) identifying values for one or more machine learning parameters for one or more predictive programs, such as the machine learning ensembles described below. The input module may receive user input from separate client devices for multiple users 104 over a data network 106, from a shared interface for multiple users 104 on a single device, or the like as described above with regard to FIG. 1A. The input module 202, in certain embodiments, may cooperate with an operating system, a device driver, an input/output (I/O) interface, or the like to receive notification of user input, data values or manipulations of user input, or other user input information.

In one embodiment, the display module 204 is configured to display one or more machine learning inputs, outputs, results, or other parameters for an identified machine learning parameter adjusted by a user or another client 104 in response to the input module 202 receiving user input as described above. The machine learning module 212 described below may determine one or more machine learning results using machine learning (e.g., a machine learning ensemble or another predictive program). The pre-compute module 208 described below may pre-cache or store pre-computed or simulated machine learning results, indexed by machine learning parameters, and the display module 204 may cooperate with the pre-compute module 208 to locate machine learning results for one or more identified machine learning parameters.

The display module 204, in certain embodiments, may be configured to display one or more attributes of a data set used by the machine learning to determine the one or more machine learning results and one or more impact metrics for each displayed attribute, one or more of which may be stored by the pre-compute module 208 in a results data structure, or the like. For example, the display module 204 may display a list, ranking, and/or statistics associated with specific features, instances, or other attributes indicating how predictive an attribute was (e.g., an impact), what contribution an attribute made to a result, a frequency that an attribute occurred, a coverage or range for an attribute in the data set, or the like.

In one embodiment, a machine learning parameter comprises an input and/or an output of the machine learning adjusted by user input. Machine learning results, in certain embodiments, comprise an input and/or an output of the machine learning determined based on an adjusted machine learning parameter. Therefore, a machine learning parameter and/or a machine learning result may comprise an attribute of a feature, a target value for a goal, an action relating to a goal, a confidence metric, a target of an action, or the like as described above.

The display module 204, in certain embodiments, is configured to display predetermined machine learning results to multiple users based on identified values. The display module 204 may be configured to display one or more machine learning results as entries in a graphical table, as an adjustment to a slider graphical user interface element, as an attribute of a displayed object, or the like as described above. The display module 204, in certain embodiments, may provide animated replay and/or recording capabilities, allowing a user to record visualizations of machine learning results and/or other parameters for later viewing, preserving user manipulations and adjustments and updates to the displayed visualizations by the update module 206. In a further embodiment, the display module 204 may provide a graphical user interface element for scrubbing or looping a display of machine learning results and/or other parameters. For example, the display module 204 may provide a scrubbing slider which a user may drag to adjust a time of an animated display of machine learning results, to re-watch or further interact with the visualization and/or previous user input to machine learning parameters. Such tools may supplement or improve the experiential nature of the visualization provided by the display module 204.

In one embodiment, the update module 206 is configured to dynamically update one or more machine learning inputs, outputs, results, and/or other parameters displayed by the display module 204. The update module 206 may updated displayed machine learning inputs, outputs, results, and/or other parameters in response to the input module 202 receiving additional user input identifying a value for a machine learning parameter, such as an adjusted or updated value.

As described below with regard to the recommendation module 214, the display module 204 may initially display recommended or optimal machine learning inputs, outputs, results, or other parameters. The update module 206 may monitor user input from the input module 202 to detect or otherwise receive user adjustments or updates to displayed machine learning parameters. The update module 206 may determine adjustments, updates, or other changes to the remaining machine learning inputs, outputs, results, and/or other parameters based on the user input adjusting or updating the displayed parameters.

As described below with regard to the pre-compute module, the update module 206 may lookup adjusted or updated machine learning inputs, outputs, results, and/or other parameters in a results data structure, to determine what adjustments or updates to make to the displayed machine learning inputs, outputs, results, or other parameters. In other embodiments, without a pre-compute module 208 or the like, the update module 206 may input one or more machine learning parameters into machine learning, such as a machine learning ensemble or other predictive program, to determine adjustments or updates to make to the displayed machine learning inputs, outputs, results, or other parameters, however processing data with machine learning during runtime of a graphical user interface may be significantly slower (e.g., hours and/or days) than pre-computing and/or pre-caching machine learning parameters and/or results.

Figure 2B:
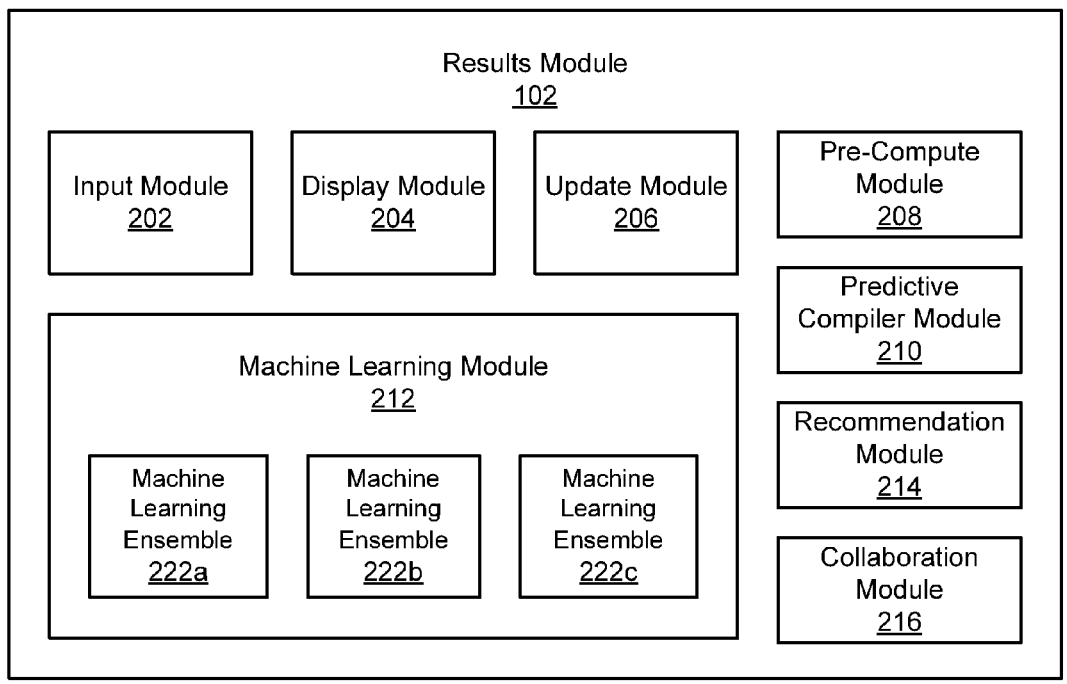
FIG. 2B is a schematic block diagram illustrating another embodiment of a results module.

FIG. 2B depicts a further embodiment of the results module 102. In the depicted embodiment, the results module 102 includes the input module 202, the display module 204, and the update module 206, and further includes a pre-compute module 208, a predictive compiler module 210, a machine learning module 212, a recommendation module 214, and a collaboration module 216.

In one embodiment, the pre-compute module 208 is configured to predetermine, pre-compute, and/or pre-cache, using machine learning, permutations of machine learning results and/or other machine learning parameters. For example, the pre-compute module 208 may pre-compute and/or pre-cache machine learning results at predefined increments (e.g., 1% increments, 5% increments, time based increments, integer increments, or the like) between a minimum value for a machine learning parameter and a maximum value for a machine learning parameter, or the like. In certain embodiments, the pre-compute module 208 may simulate or predetermine permutations of machine learning results prior to the input module 202 receiving user input (e.g., prior to runtime for the input module 202), so that cached machine learning results are available for the display module 204 to display.

In certain embodiments, the pre-compute module 208 may use actual workload data, historical data, or the like from a user to pre-compute and/or pre-cache machine learning results for the user. For example, the pre-compute module 208 may process historical sales information, customer information, or the like for a user using machine learning to predetermine and cache machine learning results for a business goal of the user. The pre-compute module 208 may fill-in, pad, or simulate missing values in a user's data, in order to pre-compute each possible machine learning result for the user. In certain embodiments, the pre-compute module 208 may fill-in, pad, or simulate missing values in a user's data based on the user's data, to maintain one or more existing attributes of the data (e.g., percentage of customers with a specified gender, geographic locations of customers, order amounts). For example, the pre-compute module 208 may fill-in, pad, or simulate missing values by determining a most likely value for the missing values using machine learning.

The pre-compute module 208 may configured to cache predetermined permutations of machine learning results for the update module 206 in a results data structure indexed by machine learning parameters, facilitating lookups of machine learning results for user-adjusted machine learning parameters. A results data structure may comprise a lookup table, a tree, a linked list, a heap, a stack, or another indexable data structure. The pre-compute module 208 may populate the results data structure prior to the input module 202 receiving user input identifying a value for a machine learning parameter, so that the display module 204 and/or the update module 206 may dynamically display corresponding machine learning parameters and machine learning results from the results data structure in response to user input selecting a value for a machine learning parameter, a machine learning result, or the like.

The pre-compute module 208, in one embodiment, is configured to predetermine, using multiple predictive programs such as machine learning ensembles or the like, permutations of machine learning results for each of the predictive programs at predefined increments between minimum values for machine learning parameters and maximum values for the machine learning parameters. In this manner, the pre-compute module 208 may allow the collaboration module 216 to determine the impact of changes or adjustments to machine learning parameters on the machine learning results of other predictive programs, in a collaborative environment or the like. For example, the pre-compute module 208 may compare definitions of features, instances or attributes of features, or the like for data from different users, for different machine learning ensembles or predictive programs, and may determine which machine learning parameters are the same (e.g., each data set includes a zip code or another common feature or parameter).

In one embodiment, the predictive compiler module 210 is configured to generate machine learning, such as a machine learning ensemble 222 with program code for a plurality of learned functions from multiple machine learning classes, or the like, as described below. The program code generated by the predictive compiler module 210 may be configured to execute on a predictive virtual machine, on a host processor, or the like to predict machine learning results based on one or more machine learning parameters.

As described below with regard to FIGS. 3 and 4, the machine learning module 212 may be configured to generate machine learning using a compiler/virtual machine paradigm. The machine learning module 212 may generate a machine learning ensemble with executable program code (e.g., program script instructions, assembly code, byte code, object code, or the like) for multiple learned functions, a metadata rule set, an orchestration module, or the like. The machine learning module 212 may provide a predictive virtual machine or interpreter configured to execute the program code of a machine learning ensemble with workload data to provide one or more machine learning results.

In one embodiment, the machine learning module 212 is configured to cooperate with the pre-compute module 208 or the like to determine machine learning results from one or more machine learning ensembles 222a-b or other predictive programs based on machine learning parameters.

In one embodiment, the recommendation module 214 is configured to select a suggested or optimal set of machine learning results for the display module 204 to initially display to a user 104 prior to the input module 202 receiving user input, as a set of default or recommended machine learning results or the like.

In one embodiment, the collaboration module 216 is configured to determine an impact on one or more machine learning results based on different user inputs received from different users, for multiple machine learning ensembles 222a-b or other different predictive programs. For example, the input module 202 may be configured to receive different user input from different users identifying different values for different machine learning parameters. The display module 204 may be configured to display multiple sets of machine learning results to multiple users 104 and the update module 206 may be configured to dynamically update displayed sets of one or more machine learning results in response to user input from one or more users.

The collaboration module 216 may be configured to determine an impact on machine learning results from one or more machine learning ensembles 222a-c or other predictive programs based on an identified value for a machine learning parameter. Different users may provide user input identifying values for different predictive programs such as different machine learning ensembles 222. For example, users from different corporate units or departments may each manipulate or adjust machine learning parameters for a machine learning ensemble 222 or other predictive program for their respective unit or department. The display module 204 may be configured to display the impact on the machine learning results on a shared display 110 for multiple users, to display machine learning results for different machine learning ensembles 222a-c or other predictive programs on different displays 110A-B for multiple users, or the like.

Figure 3:
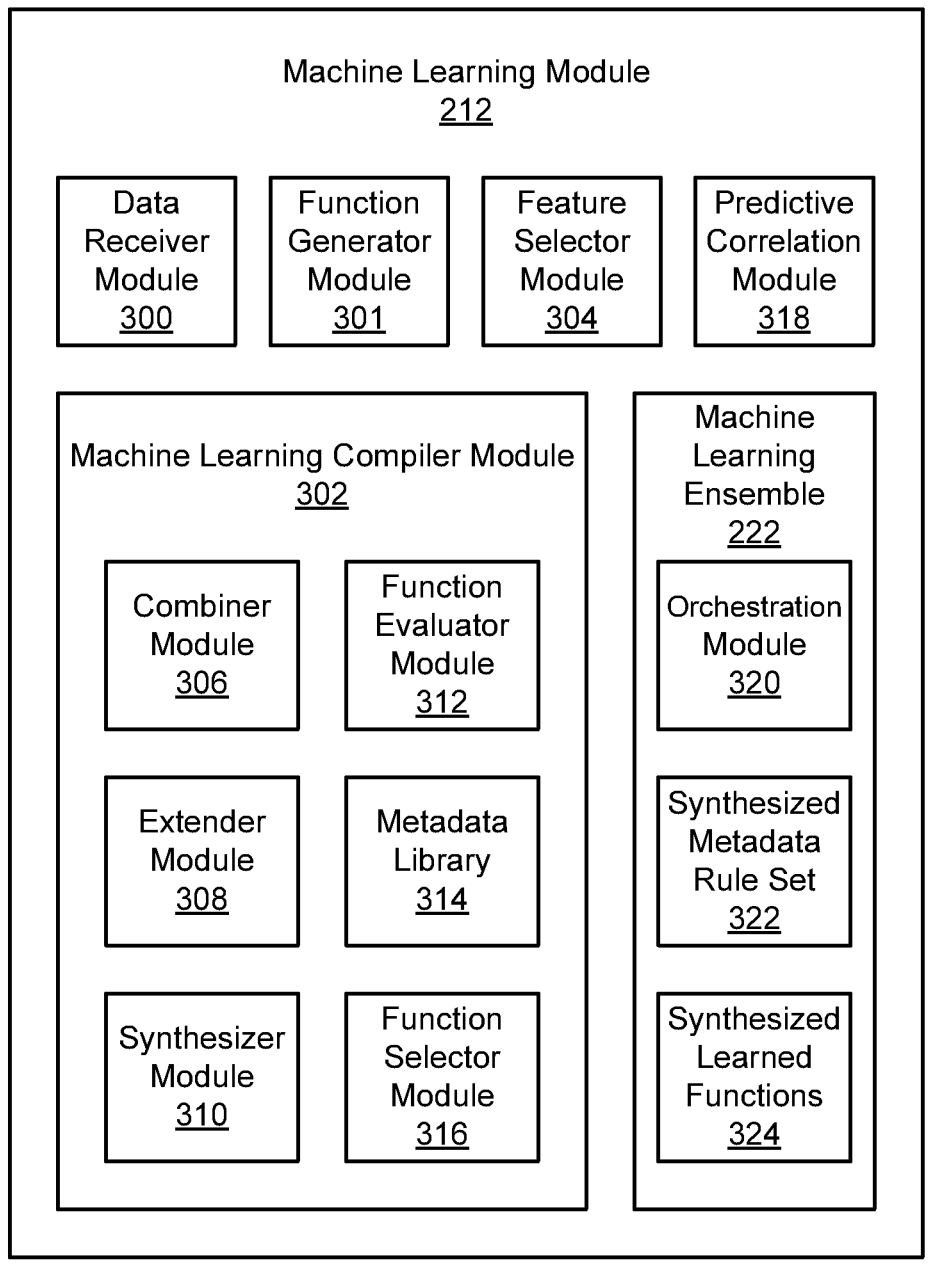
FIG. 3 is a schematic block diagram illustrating one embodiment of an machine learning module.

FIG. 3 depicts one embodiment of a machine learning module 212. The machine learning module 212 of FIG. 3, in certain embodiments, may be substantially similar to the predictive compiler module 210 described above with regard to FIG. 2B. In the depicted embodiment, the machine learning module 212 includes a data receiver module 300, a function generator module 301, a machine learning compiler module 302, a feature selector module 304 a predictive correlation module 318, and a machine learning ensemble 222. The machine learning compiler module 302, in the depicted embodiment, includes a combiner module 306, an extender module 308, a synthesizer module 310, a function evaluator module 312, a metadata library 314, and a function selector module 316. The machine learning ensemble 222, in the depicted embodiment, includes an orchestration module 320, a synthesized metadata rule set 322, and synthesized learned functions 324.

The data receiver module 300, in certain embodiments, is configured to receive client data, such as training data, test data, workload data, or the like, from a client 104, either directly or indirectly. The data receiver module 300, in various embodiments, may receive data over a local channel 108 such as an API, a shared library, a hardware command interface, or the like; over a data network 106 such as wired or wireless LAN, WAN, the Internet, a serial connection, a parallel connection, or the like. In certain embodiments, the data receiver module 300 may receive data indirectly from a client 104 through an intermediate module that may pre-process, reformat, or otherwise prepare the data for the machine learning module 212. The data receiver module 300 may support structured data, unstructured data, semi-structured data, or the like.

One type of data that the data receiver module 300 may receive, as part of a new ensemble request or the like, is initialization data. The machine learning module 212, in certain embodiments, may use initialization data to train and test learned functions from which the machine learning module 212 may build a machine learning ensemble 222. Initialization data may comprise historical data, statistics, Big Data, customer data, marketing data, computer system logs, computer application logs, data networking logs, or other data that a client 104 provides to the data receiver module 300 with which to build, initialize, train, and/or test a machine learning ensemble 222.

Another type of data that the data receiver module 300 may receive, as part of an analysis request or the like, is workload data. The machine learning module 212, in certain embodiments, may process workload data using a machine learning ensemble 222 to obtain a result, such as a classification, a confidence metric, an inferred function, a regression function, an answer, a prediction, a recognized pattern, a rule, a recommendation, an evaluation, or the like. Workload data for a specific machine learning ensemble 222, in one embodiment, has substantially the same format as the initialization data used to train and/or evaluate the machine learning ensemble 222. For example, initialization data and/or workload data may include one or more features. As used herein, a feature may comprise a column, category, data type, attribute, characteristic, label, or other grouping of data. For example, in embodiments where initialization data and/or workload data that is organized in a table format, a column of data may be a feature. Initialization data and/or workload data may include one or more instances of the associated features. In a table format, where columns of data are associated with features, a row of data is an instance.

As described below with regard to FIG. 4, in one embodiment, the data receiver module 300 may maintain client data, such as initialization data and/or workload data, in a data repository 406, where the function generator module 301, the machine learning compiler module 302, or the like may access the data. In certain embodiments, as described below, the function generator module 301 and/or the machine learning compiler module 302 may divide initialization data into subsets, using certain subsets of data as training data for generating and training learned functions and using certain subsets of data as test data for evaluating generated learned functions.

The function generator module 301, in certain embodiments, is configured to generate a plurality of learned functions based on training data from the data receiver module 300. A learned function, as used herein, comprises a computer readable code that accepts an input and provides a result. A learned function may comprise a compiled code, a script, text, a data structure, a file, a function, or the like. In certain embodiments, a learned function may accept instances of one or more features as input, and provide a result, such as a classification, a confidence metric, an inferred function, a regression function, an answer, a prediction, a recognized pattern, a rule, a recommendation, an evaluation, or the like. In another embodiment, certain learned functions may accept instances of one or more features as input, and provide a subset of the instances, a subset of the one or more features, or the like as an output. In a further embodiment, certain learned functions may receive the output or result of one or more other learned functions as input, such as a Bayes classifier, a Boltzmann machine, or the like.

The function generator module 301 may generate learned functions from multiple different machine learning classes, models, or algorithms. For example, the function generator module 301 may generate decision trees; decision forests; kernel classifiers and regression machines with a plurality of reproducing kernels; non-kernel regression and classification machines such as logistic, CART, multi-layer neural nets with various topologies; Bayesian-type classifiers such as Naïve Bayes and Boltzmann machines; logistic regression; multinomial logistic regression; probit regression; AR; MA; ARMA; ARCH; GARCH; VAR; survival or duration analysis; MARS; radial basis functions; support vector machines; k-nearest neighbors; geospatial predictive modeling; and/or other classes of learned functions.

In one embodiment, the function generator module 301 generates learned functions pseudo-randomly, without regard to the effectiveness of the generated learned functions, without prior knowledge regarding the suitability of the generated learned functions for the associated training data, or the like. For example, the function generator module 301 may generate a total number of learned functions that is large enough that at least a subset of the generated learned functions are statistically likely to be effective. As used herein, pseudo-randomly indicates that the function generator module 301 is configured to generate learned functions in an automated manner, without input or selection of learned functions, machine learning classes or models for the learned functions, or the like by a Data Scientist, expert, or other user.

The function generator module 301, in certain embodiments, generates as many learned functions as possible for a requested machine learning ensemble 222, given one or more parameters or limitations. A client 104 may provide a parameter or limitation for learned function generation as part of a new ensemble request or the like to an interface module 402 as described below with regard to FIG. 4, such as an amount of time; an allocation of system resources such as a number of processor nodes or cores, or an amount of volatile memory; a number of learned functions; runtime constraints on the requested ensemble 222 such as an indicator of whether or not the requested ensemble 222 should provide results in real-time; and/or another parameter or limitation from a client 104.

The number of learned functions that the function generator module 301 may generate for building a machine learning ensemble 222 may also be limited by capabilities of the system 100, such as a number of available processors or processor cores, a current load on the system 100, a price of remote processing resources over the data network 106; or other hardware capabilities of the system 100 available to the function generator module 301. The function generator module 301 may balance the hardware capabilities of the system 100 with an amount of time available for generating learned functions and building a machine learning ensemble 222 to determine how many learned functions to generate for the machine learning ensemble 222.

In one embodiment, the function generator module 301 may generate at least 50 learned functions for a machine learning ensemble 222. In a further embodiment, the function generator module 301 may generate hundreds, thousands, or millions of learned functions, or more, for a machine learning ensemble 222. By generating an unusually large number of learned functions from different classes without regard to the suitability or effectiveness of the generated learned functions for training data, in certain embodiments, the function generator module 301 ensures that at least a subset of the generated learned functions, either individually or in combination, are useful, suitable, and/or effective for the training data without careful curation and fine tuning by a Data Scientist or other expert.

Similarly, by generating learned functions from different machine learning classes without regard to the effectiveness or the suitability of the different machine learning classes for training data, the function generator module 301, in certain embodiments, may generate learned functions that are useful, suitable, and/or effective for the training data due to the sheer amount of learned functions generated from the different machine learning classes. This brute force, trial-and-error approach to generating learned functions, in certain embodiments, eliminates or minimizes the role of a Data Scientist or other expert in generation of a machine learning ensemble 222.

The function generator module 301, in certain embodiments, divides initialization data from the data receiver module 300 into various subsets of training data, and may use different training data subsets, different combinations of multiple training data subsets, or the like to generate different learned functions. The function generator module 301 may divide the initialization data into training data subsets by feature, by instance, or both. For example, a training data subset may comprise a subset of features of initialization data, a subset of features of initialization data, a subset of both features and instances of initialization data, or the like. Varying the features and/or instances used to train different learned functions, in certain embodiments, may further increase the likelihood that at least a subset of the generated learned functions are useful, suitable, and/or effective. In a further embodiment, the function generator module 301 ensures that the available initialization data is not used in its entirety as training data for any one learned function, so that at least a portion of the initialization data is available for each learned function as test data, which is described in greater detail below with regard to the function evaluator module 312 of FIG. 3.

In one embodiment, the function generator module 301 may also generate additional learned functions in cooperation with the machine learning compiler module 302. The function generator module 301 may provide a learned function request interface, allowing the machine learning compiler module 302 or another module, a client 104, or the like to send a learned function request to the function generator module 301 requesting that the function generator module 301 generate one or more additional learned functions. In one embodiment, a learned function request may include one or more attributes for the requested one or more learned functions. For example, a learned function request, in various embodiments, may include a machine learning class for a requested learned function, one or more features for a requested learned function, instances from initialization data to use as training data for a requested learned function, runtime constraints on a requested learned function, or the like. In another embodiment, a learned function request may identify initialization data, training data, or the like for one or more requested learned functions and the function generator module 301 may generate the one or more learned functions pseudo-randomly, as described above, based on the identified data.

The machine learning compiler module 302, in one embodiment, is configured to form a machine learning ensemble 222 using learned functions from the function generator module 301. As used herein, a machine learning ensemble 222 comprises an organized set of a plurality of learned functions. Providing a classification, a confidence metric, an inferred function, a regression function, an answer, a prediction, a recognized pattern, a rule, a recommendation, or another result using a machine learning ensemble 222, in certain embodiments, may be more accurate than using a single learned function.

The machine learning compiler module 302 is described in greater detail below with regard to FIG. 3. The machine learning compiler module 302, in certain embodiments, may combine and/or extend learned functions to form new learned functions, may request additional learned functions from the function generator module 301, or the like for inclusion in a machine learning ensemble 222. In one embodiment, the machine learning compiler module 302 evaluates learned functions from the function generator module 301 using test data to generate evaluation metadata. The machine learning compiler module 302, in a further embodiment, may evaluate combined learned functions, extended learned functions, combined-extended learned functions, additional learned functions, or the like using test data to generate evaluation metadata.

The machine learning compiler module 302, in certain embodiments, maintains evaluation metadata in a metadata library 314, as described below with regard to FIGS. 3 and 4. The machine learning compiler module 302 may select learned functions (e.g. learned functions from the function generator module 301, combined learned functions, extended learned functions, learned functions from different machine learning classes, and/or combined-extended learned functions) for inclusion in a machine learning ensemble 222 based on the evaluation metadata. In a further embodiment, the machine learning compiler module 302 may synthesize the selected learned functions into a final, synthesized function or function set for a machine learning ensemble 222 based on evaluation metadata. The machine learning compiler module 302, in another embodiment, may include synthesized evaluation metadata in a machine learning ensemble 222 for directing data through the machine learning ensemble 222 or the like.

In one embodiment, the feature selector module 304 determines which features of initialization data to use in the machine learning ensemble 222, and in the associated learned functions, and/or which features of the initialization data to exclude from the machine learning ensemble 222, and from the associated learned functions. As described above, initialization data, and the training data and test data derived from the initialization data, may include one or more features. Learned functions and the machine learning ensembles 222 that they form are configured to receive and process instances of one or more features. Certain features may be more predictive than others, and the more features that the machine learning compiler module 302 processes and includes in the generated machine learning ensemble 222, the more processing overhead used by the machine learning compiler module 302, and the more complex the generated machine learning ensemble 222 becomes. Additionally, certain features may not contribute to the effectiveness or accuracy of the results from a machine learning ensemble 222, but may simply add noise to the results.

The feature selector module 304, in one embodiment, cooperates with the function generator module 301 and the machine learning compiler module 302 to evaluate the effectiveness of various features, based on evaluation metadata from the metadata library 314 described below. For example, the function generator module 301 may generate a plurality of learned functions for various combinations of features, and the machine learning compiler module 302 may evaluate the learned functions and generate evaluation metadata. Based on the evaluation metadata, the feature selector module 304 may select a subset of features that are most accurate or effective, and the machine learning compiler module 302 may use learned functions that utilize the selected features to build the machine learning ensemble 222. The feature selector module 304 may select features for use in the machine learning ensemble 222 based on evaluation metadata for learned functions from the function generator module 301, combined learned functions from the combiner module 306, extended learned functions from the extender module 308, combined extended functions, synthesized learned functions from the synthesizer module 310, or the like.

In a further embodiment, the feature selector module 304 may cooperate with the machine learning compiler module 302 to build a plurality of different machine learning ensembles 222 for the same initialization data or training data, each different machine learning ensemble 222 utilizing different features of the initialization data or training data. The machine learning compiler module 302 may evaluate each different machine learning ensemble 222, using the function evaluator module 312 described below, and the feature selector module 304 may select the machine learning ensemble 222 and the associated features which are most accurate or effective based on the evaluation metadata for the different machine learning ensembles 222. In certain embodiments, the machine learning compiler module 302 may generate tens, hundreds, thousands, millions, or more different machine learning ensembles 222 so that the feature selector module 304 may select an optimal set of features (e.g. the most accurate, most effective, or the like) with little or no input from a Data Scientist, expert, or other user in the selection process.

In one embodiment, the machine learning compiler module 302 may generate a machine learning ensemble 222 for each possible combination of features from which the feature selector module 304 may select. In a further embodiment, the machine learning compiler module 302 may begin generating machine learning ensembles 222 with a minimal number of features, and may iteratively increase the number of features used to generate machine learning ensembles 222 until an increase in effectiveness or usefulness of the results of the generated machine learning ensembles 222 fails to satisfy a feature effectiveness threshold. By increasing the number of features until the increases stop being effective, in certain embodiments, the machine learning compiler module 302 may determine a minimum effective set of features for use in a machine learning ensemble 222, so that generation and use of the machine learning ensemble 222 is both effective and efficient. The feature effectiveness threshold may be predetermined or hard coded, may be selected by a client 104 as part of a new ensemble request or the like, may be based on one or more parameters or limitations, or the like.

During the iterative process, in certain embodiments, once the feature selector module 304 determines that a feature is merely introducing noise, the machine learning compiler module 302 excludes the feature from future iterations, and from the machine learning ensemble 222. In one embodiment, a client 104 may identify one or more features as required for the machine learning ensemble 222, in a new ensemble request or the like. The feature selector module 304 may include the required features in the machine learning ensemble 222, and select one or more of the remaining optional features for inclusion in the machine learning ensemble 222 with the required features.

In a further embodiment, based on evaluation metadata from the metadata library 314, the feature selector module 304 determines which features from initialization data and/or training data are adding noise, are not predictive, are the least effective, or the like, and excludes the features from the machine learning ensemble 222. In other embodiments, the feature selector module 304 may determine which features enhance the quality of results, increase effectiveness, or the like, and selects the features for the machine learning ensemble 222.

In one embodiment, the feature selector module 304 causes the machine learning compiler module 302 to repeat generating, combining, extending, and/or evaluating learned functions while iterating through permutations of feature sets. At each iteration, the function evaluator module 312 may determine an overall effectiveness of the learned functions in aggregate for the current iteration's selected combination of features. Once the feature selector module 304 identifies a feature as noise introducing, the feature selector module may exclude the noisy feature and the machine learning compiler module 302 may generate a machine learning ensemble 222 without the excluded feature. In one embodiment, the predictive correlation module 318 determines one or more features, instances of features, or the like that correlate with higher confidence metrics (e.g. that are most effective in predicting results with high confidence). The predictive correlation module 318 may cooperate with, be integrated with, or otherwise work in concert with the feature selector module 304 to determine one or more features, instances of features, or the like that correlate with higher confidence metrics. For example, as the feature selector module 304 causes the machine learning compiler module 302 to generate and evaluate learned functions with different sets of features, the predictive correlation module 318 may determine which features and/or instances of features correlate with higher confidence metrics, are most effective, or the like based on metadata from the metadata library 314.

The predictive correlation module 318, in certain embodiments, is configured to harvest metadata regarding which features correlate to higher confidence metrics, to determine which feature was predictive of which outcome or result, or the like. In one embodiment, the predictive correlation module 318 determines the relationship of a feature's predictive qualities for a specific outcome or result based on each instance of a particular feature. In other embodiments, the predictive correlation module 318 may determine the relationship of a feature's predictive qualities based on a subset of instances of a particular feature. For example, the predictive correlation module 318 may discover a correlation between one or more features and the confidence metric of a predicted result by attempting different combinations of features and subsets of instances within an individual feature's dataset, and measuring an overall impact on predictive quality, accuracy, confidence, or the like. The predictive correlation module 318 may determine predictive features at various granularities, such as per feature, per subset of features, per instance, or the like.

In one embodiment, the predictive correlation module 318 determines one or more features with a greatest contribution to a predicted result or confidence metric as the machine learning compiler module 302 forms the machine learning ensemble 222, based on evaluation metadata from the metadata library 314, or the like. For example, the machine learning compiler module 302 may build one or more synthesized learned functions 324 that are configured to provide one or more features with a greatest contribution as part of a result. In another embodiment, the predictive correlation module 318 may determine one or more features with a greatest contribution to a predicted result or confidence metric dynamically at runtime as the machine learning ensemble 222 determines the predicted result or confidence metric. In such embodiments, the predictive correlation module 318 may be part of, integrated with, or in communication with the machine learning ensemble 222. The predictive correlation module 318 may cooperate with the machine learning ensemble 222, such that the machine learning ensemble 222 provides a listing of one or more features that provided a greatest contribution to a predicted result or confidence metric as part of a response to an analysis request.

In determining features that are predictive, or that have a greatest contribution to a predicted result or confidence metric, the predictive correlation module 318 may balance a frequency of the contribution of a feature and/or an impact of the contribution of the feature. For example, a certain feature or set of features may contribute to the predicted result or confidence metric frequently, for each instance or the like, but have a low impact. Another feature or set of features may contribute relatively infrequently, but has a very high impact on the predicted result or confidence metric (e.g. provides at or near 100% confidence or the like). While the predictive correlation module 318 is described herein as determining features that are predictive or that have a greatest contribution, in other embodiments, the predictive correlation module 318 may determine one or more specific instances of a feature that are predictive, have a greatest contribution to a predicted result or confidence metric, or the like.

In the depicted embodiment, the machine learning compiler module 302 includes a combiner module 306. The combiner module 306 combines learned functions, forming sets, strings, groups, trees, or clusters of combined learned functions. In certain embodiments, the combiner module 306 combines learned functions into a prescribed order, and different orders of learned functions may have different inputs, produce different results, or the like. The combiner module 306 may combine learned functions in different combinations. For example, the combiner module 306 may combine certain learned functions horizontally or in parallel, joined at the inputs and at the outputs or the like, and may combine certain learned functions vertically or in series, feeding the output of one learned function into the input of another learned function.

The combiner module 306 may determine which learned functions to combine, how to combine learned functions, or the like based on evaluation metadata for the learned functions from the metadata library 314, generated based on an evaluation of the learned functions using test data, as described below with regard to the function evaluator module 312. The combiner module 306 may request additional learned functions from the function generator module 301, for combining with other learned functions. For example, the combiner module 306 may request a new learned function with a particular input and/or output to combine with an existing learned function, or the like.

While the combining of learned functions may be informed by evaluation metadata for the learned functions, in certain embodiments, the combiner module 306 combines a large number of learned functions pseudo-randomly, forming a large number of combined functions. For example, the combiner module 306, in one embodiment, may determine each possible combination of generated learned functions, as many combinations of generated learned functions as possible given one or more limitations or constraints, a selected subset of combinations of generated learned functions, or the like, for evaluation by the function evaluator module 312. In certain embodiments, by generating a large number of combined learned functions, the combiner module 306 is statistically likely to form one or more combined learned functions that are useful and/or effective for the training data.

In the depicted embodiment, the machine learning compiler module 302 includes an extender module 308. The extender module 308, in certain embodiments, is configured to add one or more layers to a learned function. For example, the extender module 308 may extend a learned function or combined learned function by adding a probabilistic model layer, such as a Bayesian belief network layer, a Bayes classifier layer, a Boltzman layer, or the like.

Certain classes of learned functions, such as probabilistic models, may be configured to receive either instances of one or more features as input, or the output results of other learned functions, such as a classification and a confidence metric, an inferred function, a regression function, an answer, a prediction, a recognized pattern, a rule, a recommendation, an evaluation, or the like. The extender module 308 may use these types of learned functions to extend other learned functions. The extender module 308 may extend learned functions generated by the function generator module 301 directly, may extend combined learned functions from the combiner module 306, may extend other extended learned functions, may extend synthesized learned functions from the synthesizer module 310, or the like.

In one embodiment, the extender module 308 determines which learned functions to extend, how to extend learned functions, or the like based on evaluation metadata from the metadata library 314. The extender module 308, in certain embodiments, may request one or more additional learned functions from the function generator module 301 and/or one or more additional combined learned functions from the combiner module 306, for the extender module 308 to extend.

While the extending of learned functions may be informed by evaluation metadata for the learned functions, in certain embodiments, the extender module 308 generates a large number of extended learned functions pseudo-randomly. For example, the extender module 308, in one embodiment, may extend each possible learned function and/or combination of learned functions, may extend a selected subset of learned functions, may extend as many learned functions as possible given one or more limitations or constraints, or the like, for evaluation by the function evaluator module 312. In certain embodiments, by generating a large number of extended learned functions, the extender module 308 is statistically likely to form one or more extended learned functions and/or combined extended learned functions that are useful and/or effective for the training data.

In the depicted embodiment, the machine learning compiler module 302 includes a synthesizer module 310. The synthesizer module 310, in certain embodiments, is configured to organize a subset of learned functions into the machine learning ensemble 222, as synthesized learned functions 324. In a further embodiment, the synthesizer module 310 includes evaluation metadata from the metadata library 314 of the function evaluator module 312 in the machine learning ensemble 222 as a synthesized metadata rule set 322, so that the machine learning ensemble 222 includes synthesized learned functions 324 and evaluation metadata, the synthesized metadata rule set 322, for the synthesized learned functions 324.

The learned functions that the synthesizer module 310 synthesizes or organizes into the synthesized learned functions 324 of the machine learning ensemble 222, may include learned functions directly from the function generator module 301, combined learned functions from the combiner module 306, extended learned functions from the extender module 308, combined extended learned functions, or the like. As described below, in one embodiment, the function selector module 316 selects the learned functions for the synthesizer module 310 to include in the machine learning ensemble 222. In certain embodiments, the synthesizer module 310 organizes learned functions by preparing the learned functions and the associated evaluation metadata for processing workload data to reach a result. For example, as described below, the synthesizer module 310 may organize and/or synthesize the synthesized learned functions 324 and the synthesized metadata rule set 322 for the orchestration module 320 to use to direct workload data through the synthesized learned functions 324 to produce a result.

In one embodiment, the function evaluator module 312 evaluates the synthesized learned functions 324 that the synthesizer module 310 organizes, and the synthesizer module 310 synthesizes and/or organizes the synthesized metadata rule set 322 based on evaluation metadata that the function evaluation module 312 generates during the evaluation of the synthesized learned functions 324, from the metadata library 314 or the like.

In the depicted embodiment, the machine learning compiler module 302 includes a function evaluator module 312. The function evaluator module 312 is configured to evaluate learned functions using test data, or the like. The function evaluator module 312 may evaluate learned functions generated by the function generator module 301, learned functions combined by the combiner module 306 described above, learned functions extended by the extender module 308 described above, combined extended learned functions, synthesized learned functions 324 organized into the machine learning ensemble 222 by the synthesizer module 310 described above, or the like.

Test data for a learned function, in certain embodiments, comprises a different subset of the initialization data for the learned function than the function generator module 301 used as training data. The function evaluator module 312, in one embodiment, evaluates a learned function by inputting the test data into the learned function to produce a result, such as a classification, a confidence metric, an inferred function, a regression function, an answer, a prediction, a recognized pattern, a rule, a recommendation, an evaluation, or another result.

Test data, in certain embodiments, comprises a subset of initialization data, with a feature associated with the requested result removed, so that the function evaluator module 312 may compare the result from the learned function to the instances of the removed feature to determine the accuracy and/or effectiveness of the learned function for each test instance. For example, if a client 104 has requested a machine learning ensemble 222 to predict whether a customer will be a repeat customer, and provided historical customer information as initialization data, the function evaluator module 312 may input a test data set comprising one or more features of the initialization data other than whether the customer was a repeat customer into the learned function, and compare the resulting predictions to the initialization data to determine the accuracy and/or effectiveness of the learned function.

The function evaluator module 312, in one embodiment, is configured to maintain evaluation metadata for an evaluated learned function in the metadata library 314. The evaluation metadata, in certain embodiments, comprises log data generated by the function generator module 301 while generating learned functions, the function evaluator module 312 while evaluating learned functions, or the like.

In one embodiment, the evaluation metadata includes indicators of one or more training data sets that the function generator module 301 used to generate a learned function. The evaluation metadata, in another embodiment, includes indicators of one or more test data sets that the function evaluator module 312 used to evaluate a learned function. In a further embodiment, the evaluation metadata includes indicators of one or more decisions made by and/or branches taken by a learned function during an evaluation by the function evaluator module 312. The evaluation metadata, in another embodiment, includes the results determined by a learned function during an evaluation by the function evaluator module 312. In one embodiment, the evaluation metadata may include evaluation metrics, learning metrics, effectiveness metrics, convergence metrics, or the like for a learned function based on an evaluation of the learned function. An evaluation metric, learning metrics, effectiveness metric, convergence metric, or the like may be based on a comparison of the results from a learned function to actual values from initialization data, and may be represented by a correctness indicator for each evaluated instance, a percentage, a ratio, or the like. Different classes of learned functions, in certain embodiments, may have different types of evaluation metadata.

The metadata library 314, in one embodiment, provides evaluation metadata for learned functions to the feature selector module 304, the predictive correlation module 318, the combiner module 306, the extender module 308, and/or the synthesizer module 310. The metadata library 314 may provide an API, a shared library, one or more function calls, or the like providing access to evaluation metadata. The metadata library 314, in various embodiments, may store or maintain evaluation metadata in a database format, as one or more flat files, as one or more lookup tables, as a sequential log or log file, or as one or more other data structures. In one embodiment, the metadata library 314 may index evaluation metadata by learned function, by feature, by instance, by training data, by test data, by effectiveness, and/or by another category or attribute and may provide query access to the indexed evaluation metadata. The function evaluator module 312 may update the metadata library 314 in response to each evaluation of a learned function, adding evaluation metadata to the metadata library 314 or the like.

The function selector module 316, in certain embodiments, may use evaluation metadata from the metadata library 314 to select learned functions for the combiner module 306 to combine, for the extender module 308 to extend, for the synthesizer module 310 to include in the machine learning ensemble 222, or the like. For example, in one embodiment, the function selector module 316 may select learned functions based on evaluation metrics, learning metrics, effectiveness metrics, convergence metrics, or the like. In another embodiment, the function selector module 316 may select learned functions for the combiner module 306 to combine and/or for the extender module 308 to extend based on features of training data used to generate the learned functions, or the like.

The machine learning ensemble 222, in certain embodiments, provides machine learning results for an analysis request by processing workload data of the analysis request using a plurality of learned functions (e.g., the synthesized learned functions 324). As described above, results from the machine learning ensemble 222, in various embodiments, may include a classification, a confidence metric, an inferred function, a regression function, an answer, a prediction, a recognized pattern, a rule, a recommendation, an evaluation, and/or another result. For example, in one embodiment, the machine learning ensemble 222 provides a classification and a confidence metric for each instance of workload data input into the machine learning ensemble 222, or the like. Workload data, in certain embodiments, may be substantially similar to test data, but the missing feature from the initialization data is not known, and is to be solved for by the machine learning ensemble 222. A classification, in certain embodiments, comprises a value for a missing feature in an instance of workload data, such as a prediction, an answer, or the like. For example, if the missing feature represents a question, the classification may represent a predicted answer, and the associated confidence metric may be an estimated strength or accuracy of the predicted answer. A classification, in certain embodiments, may comprise a binary value (e.g., yes or no), a rating on a scale (e.g., 4 on a scale of 1 to 5), or another data type for a feature. A confidence metric, in certain embodiments, may comprise a percentage, a ratio, a rating on a scale, or another indicator of accuracy, effectiveness, and/or confidence.

In the depicted embodiment, the machine learning ensemble 222 includes an orchestration module 320. The orchestration module 320, in certain embodiments, is configured to direct workload data through the machine learning ensemble 222 to produce a result, such as a classification, a confidence metric, an inferred function, a regression function, an answer, a prediction, a recognized pattern, a rule, a recommendation, an evaluation, and/or another result. In one embodiment, the orchestration module 320 uses evaluation metadata from the function evaluator module 312 and/or the metadata library 314, such as the synthesized metadata rule set 322, to determine how to direct workload data through the synthesized learned functions 324 of the machine learning ensemble 222. As described below with regard to FIG. 8, in certain embodiments, the synthesized metadata rule set 322 comprises a set of rules or conditions from the evaluation metadata of the metadata library 314 that indicate to the orchestration module 320 which features, instances, or the like should be directed to which synthesized learned function 324.

For example, the evaluation metadata from the metadata library 314 may indicate which learned functions were trained using which features and/or instances, how effective different learned functions were at making predictions based on different features and/or instances, or the like. The synthesizer module 310 may use that evaluation metadata to determine rules for the synthesized metadata rule set 322, indicating which features, which instances, or the like the orchestration module 320 the orchestration module 320 should direct through which learned functions, in which order, or the like. The synthesized metadata rule set 322, in one embodiment, may comprise a decision tree or other data structure comprising rules which the orchestration module 320 may follow to direct workload data through the synthesized learned functions 324 of the machine learning ensemble 222.

Figure 4:
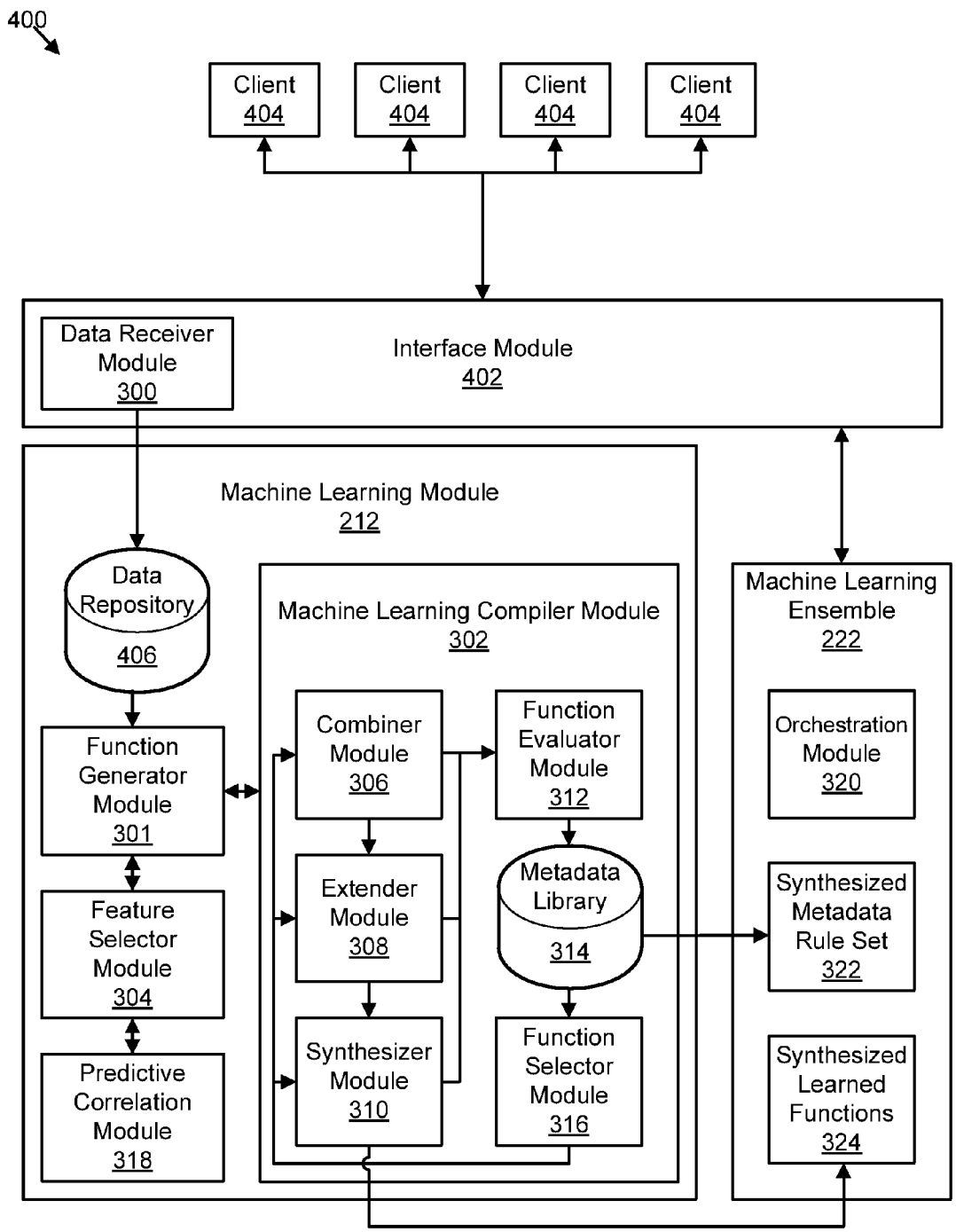
FIG. 4 is a schematic block diagram illustrating one embodiment of a system for a machine learning factory.

FIG. 4 depicts one embodiment of a system 400 for a machine learning factory. The system 400, in the depicted embodiment, includes several clients 404 in communication with an interface module 402 either locally or over a data network 106. The machine learning module 212 of FIG. 4 is substantially similar to the machine learning module 212 of FIG. 3, but further includes an interface module 402 and a data repository 406.

The interface module 402, in certain embodiments, is configured to receive requests from clients 404, to provide results to a client 404, or the like. The machine learning module 212, for example, may act as a client 404, requesting a machine learning ensemble 222 from the interface module 402 or the like. The interface module 402 may provide a machine learning interface to clients 404, such as an API, a shared library, a hardware command interface, or the like, over which clients 404 may make requests and receive results. The interface module 402 may support new ensemble requests from clients 404, allowing clients 404 to request generation of a new machine learning ensemble 222 from the machine learning module 212 or the like. As described above, a new ensemble request may include initialization data; one or more ensemble parameters; a feature, query, question or the like for which a client 404 would like a machine learning ensemble 222 to predict a result; or the like. The interface module 402 may support analysis requests for a result from a machine learning ensemble 222. As described above, an analysis request may include workload data; a feature, query, question or the like; a machine learning ensemble 222; or may include other analysis parameters.

In certain embodiments, the machine learning module 212 may maintain a library of generated machine learning ensembles 222, from which clients 404 may request results. In such embodiments, the interface module 402 may return a reference, pointer, or other identifier of the requested machine learning ensemble 222 to the requesting client 404, which the client 404 may use in analysis requests. In another embodiment, in response to the machine learning module 212 generating a machine learning ensemble 222 to satisfy a new ensemble request, the interface module 402 may return the actual machine learning ensemble 222 to the client 404, for the client 404 to manage, and the client 404 may include the machine learning ensemble 222 in each analysis request.

The interface module 402 may cooperate with the machine learning module 212 to service new ensemble requests, may cooperate with the machine learning ensemble 222 to provide a result to an analysis request, or the like. The machine learning module 212, in the depicted embodiment, includes the function generator module 301, the feature selector module 304, the predictive correlation module 318, and the machine learning compiler module 302, as described above. The machine learning module 212, in the depicted embodiment, also includes a data repository 406.

The data repository 406, in one embodiment, stores initialization data, so that the function generator module 301, the feature selector module 304, the predictive correlation module 318, and/or the machine learning compiler module 302 may access the initialization data to generate, combine, extend, evaluate, and/or synthesize learned functions and machine learning ensembles 222. The data repository 406 may provide initialization data indexed by feature, by instance, by training data subset, by test data subset, by new ensemble request, or the like. By maintaining initialization data in a data repository 406, in certain embodiments, the machine learning module 212 ensures that the initialization data is accessible throughout the machine learning ensemble 222 building process, for the function generator module 301 to generate learned functions, for the feature selector module 304 to determine which features should be used in the machine learning ensemble 222, for the predictive correlation module 318 to determine which features correlate with the highest confidence metrics, for the combiner module 306 to combine learned functions, for the extender module 308 to extend learned functions, for the function evaluator module 312 to evaluate learned functions, for the synthesizer module 310 to synthesize learned functions 324 and/or metadata rule sets 322, or the like.

In the depicted embodiment, the data receiver module 300 is integrated with the interface module 402, to receive initialization data, including training data and test data, from new ensemble requests. The data receiver module 300 stores initialization data in the data repository 406. The function generator module 301 is in communication with the data repository 406, in one embodiment, so that the function generator module 301 may generate learned functions based on training data sets from the data repository 406. The feature selector module 300 and/or the predictive correlation module 318, in certain embodiments, may cooperate with the function generator module 301 and/or the machine learning compiler module 302 to determine which features to use in the machine learning ensemble 222, which features are most predictive or correlate with the highest confidence metrics, or the like.

Within the machine learning compiler module 302, the combiner module 306, the extender module 308, and the synthesizer module 310 are each in communication with both the function generator module 301 and the function evaluator module 312. The function generator module 301, as described above, may generate an initial large amount of learned functions, from different classes or the like, which the function evaluator module 312 evaluates using test data sets from the data repository 406. The combiner module 306 may combine different learned functions from the function generator module 301 to form combined learned functions, which the function evaluator module 312 evaluates using test data from the data repository 406. The combiner module 306 may also request additional learned functions from the function generator module 301.

The extender module 308, in one embodiment, extends learned functions from the function generator module 301 and/or the combiner module 306. The extender module 308 may also request additional learned functions from the function generator module 301. The function evaluator module 312 evaluates the extended learned functions using test data sets from the data repository 406. The synthesizer module 310 organizes, combines, or otherwise synthesizes learned functions from the function generator module 301, the combiner module 306, and/or the extender module 308 into synthesized learned functions 324 for the machine learning ensemble 222. The function evaluator module 312 evaluates the synthesized learned functions 324, and the synthesizer module 310 organizes or synthesizes the evaluation metadata from the metadata library 314 into a synthesized metadata rule set 322 for the synthesized learned functions 324.

As described above, as the function evaluator module 312 evaluates learned functions from the function generator module 301, the combiner module 306, the extender module 308, and/or the synthesizer module 310, the function evaluator module 312 generates evaluation metadata for the learned functions and stores the evaluation metadata in the metadata library 314. In the depicted embodiment, in response to an evaluation by the function evaluator module 312, the function selector module 316 selects one or more learned functions based on evaluation metadata from the metadata library 314. For example, the function selector module 316 may select learned functions for the combiner module 306 to combine, for the extender module 308 to extend, for the synthesizer module 310 to synthesize, or the like.

Figure 5:
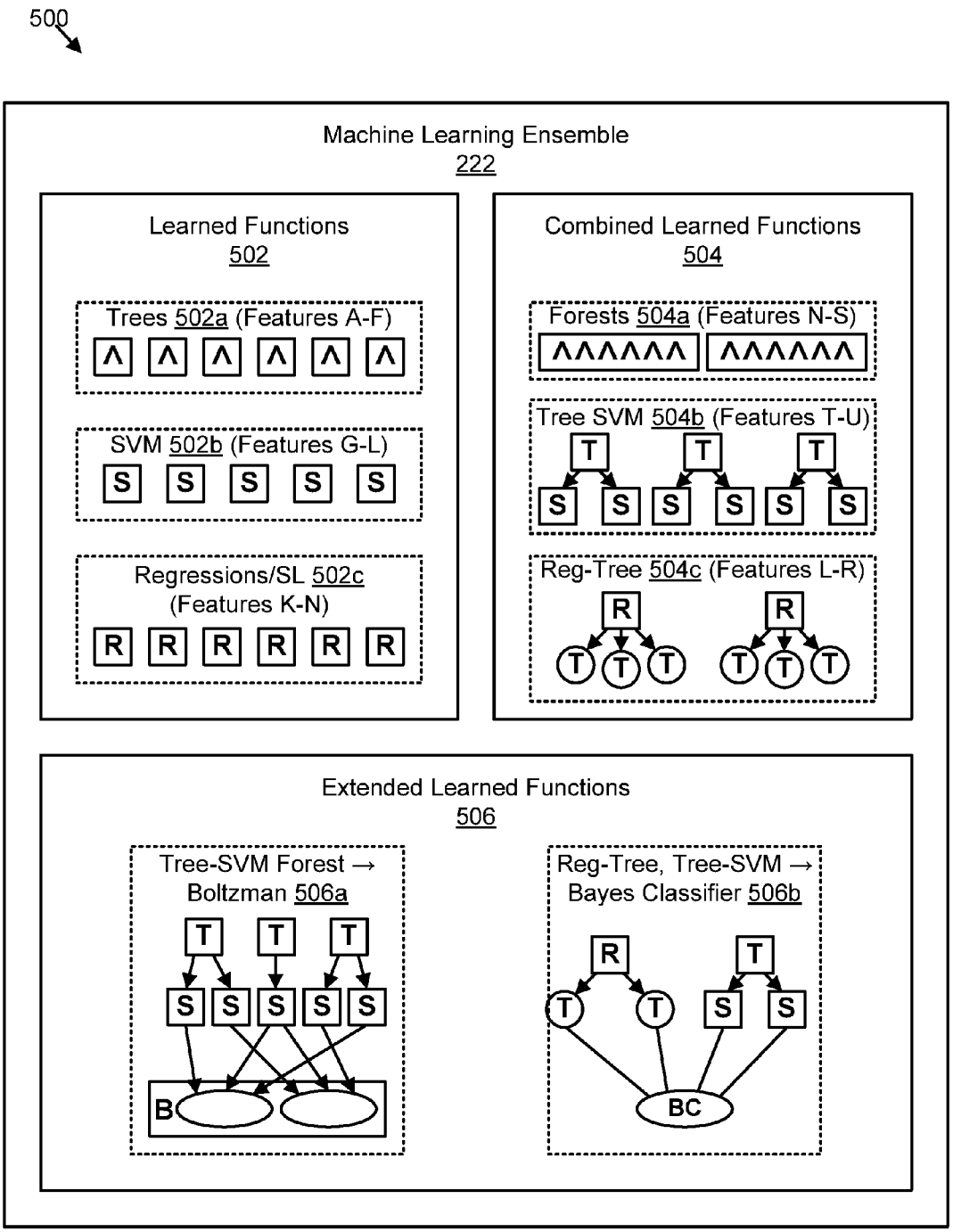
FIG. 5 is a schematic block diagram illustrating one embodiment of learned functions for a machine learning ensemble.

FIG. 5 depicts one embodiment 500 of learned functions 502, 504, 506 for a machine learning ensemble 222. The learned functions 502, 504, 506 are presented by way of example, and in other embodiments, other types and combinations of learned functions may be used, as described above. Further, in other embodiments, the machine learning ensemble 222 may include an orchestration module 320, a synthesized metadata rule set 322, or the like. In one embodiment, the function generator module 301 generates the learned functions 502. The learned functions 502, in the depicted embodiment, include various collections of selected learned functions 502 from different classes including a collection of decision trees 502a, configured to receive or process a subset A-F of the feature set of the machine learning ensemble 222, a collection of support vector machines ("SVMs") 502b with certain kernels and with an input space configured with particular subsets of the feature set G-L, and a selected group of regression models 502c, here depicted as a suite of single layer ("SL") neural nets trained on certain feature sets K-N.

The example combined learned functions 504, combined by the combiner module 306 or the like, include various instances of forests of decision trees 504a configured to receive or process features N-S, a collection of combined trees with support vector machine decision nodes 504b with specific kernels, their parameters and the features used to define the input space of features T-U, as well as combined functions 504c in the form of trees with a regression decision at the root and linear, tree node decisions at the leaves, configured to receive or process features L-R.

Component class extended learned functions 506, extended by the extender module 308 or the like, include a set of extended functions such as a forest of trees 506a with tree decisions at the roots and various margin classifiers along the branches, which have been extended with a layer of Boltzman type Bayesian probabilistic classifiers. Extended learned function 506b includes a tree with various regression decisions at the roots, a combination of standard tree 504b and regression decision tree 504c and the branches are extended by a Bayes classifier layer trained with a particular training set exclusive of those used to train the nodes.

Figure 6:
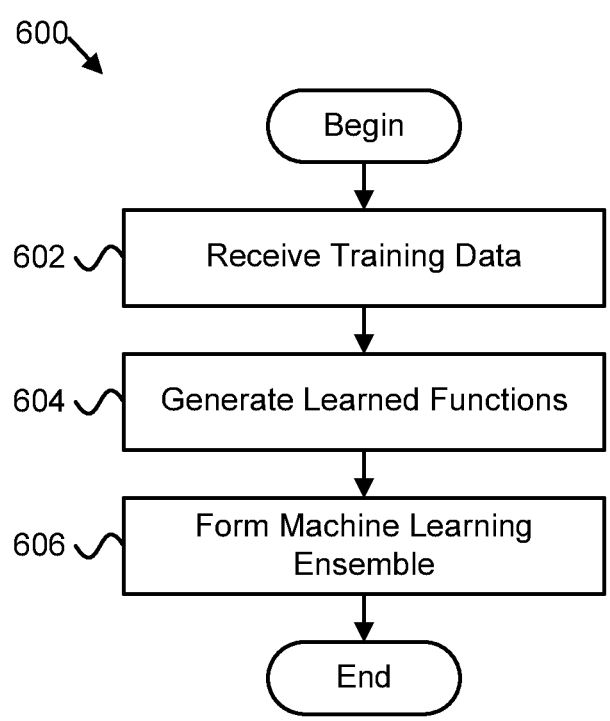
FIG. 6 is a schematic flow chart diagram illustrating one embodiment of a method for a machine learning factory.

FIG. 6 depicts one embodiment of a method 600 for a machine learning factory. The method 600 begins, and the data receiver module 300 receives 602 training data. The function generator module 301 generates 604 a plurality of learned functions from multiple classes based on the received 602 training data. The machine learning compiler module 302 forms 606 a machine learning ensemble comprising a subset of learned functions from at least two classes, and the method 600 ends.

Figure 7:
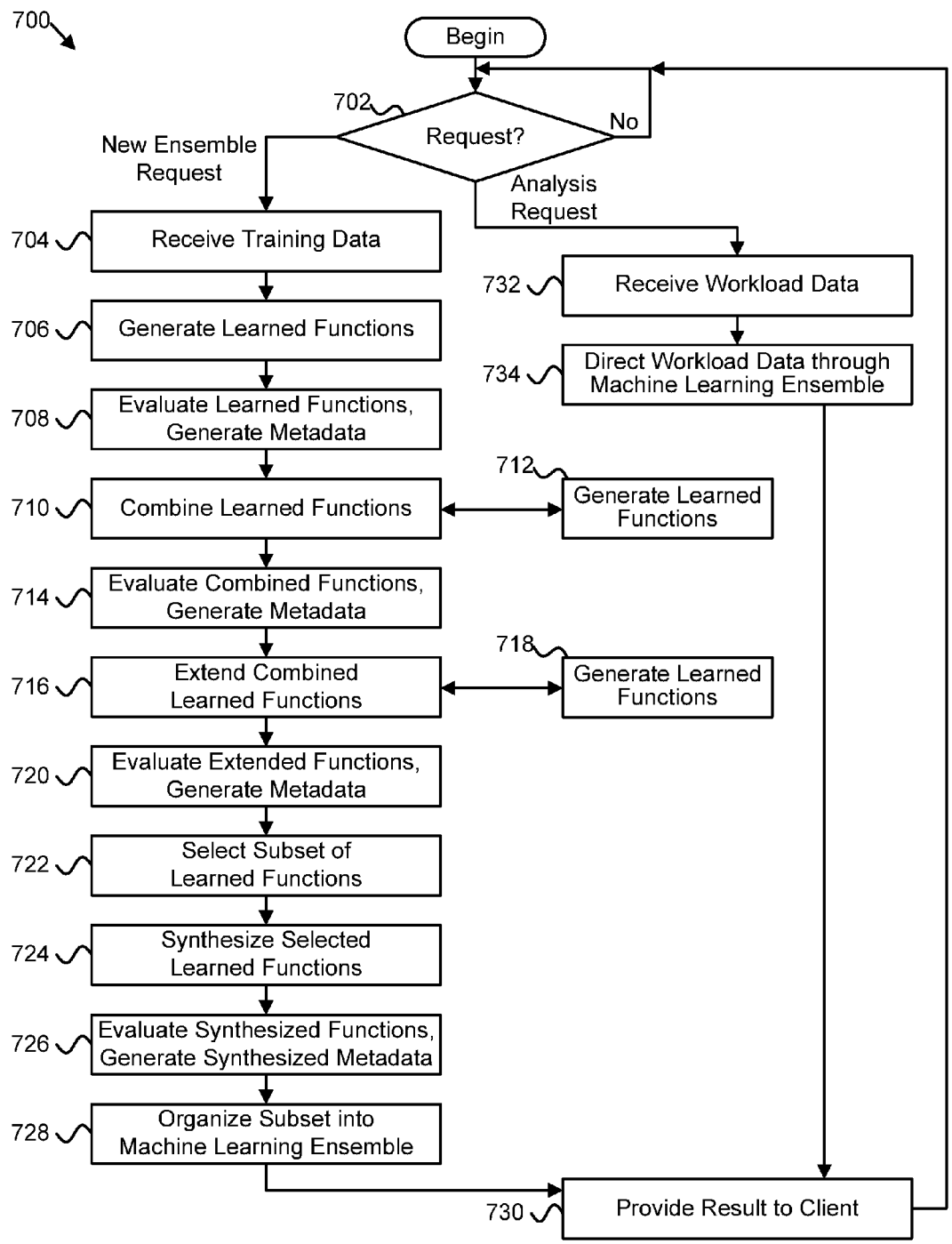
FIG. 7 is a schematic flow chart diagram illustrating another embodiment of a method for a machine learning factory.

FIG. 7 depicts another embodiment of a method 700 for a machine learning factory. The method 700 begins, and the interface module 402 monitors 702 requests until the interface module 402 receives 702 an analytics request from a client 404 or the like.

If the interface module 402 receives 702 a new ensemble request, the data receiver module 300 receives 704 training data for the new ensemble, as initialization data or the like. The function generator module 301 generates 706 a plurality of learned functions based on the received 704 training data, from different machine learning classes. The function evaluator module 312 evaluates 708 the plurality of generated 706 learned functions to generate evaluation metadata. The combiner module 306 combines 710 learned functions based on the metadata from the evaluation 708. The combiner module 306 may request that the function generator module 301 generate 712 additional learned functions for the combiner module 306 to combine.

The function evaluator module 312 evaluates 714 the combined 710 learned functions and generates additional evaluation metadata. The extender module 308 extends 716 one or more learned functions by adding one or more layers to the one or more learned functions, such as a probabilistic model layer or the like. In certain embodiments, the extender module 308 extends 716 combined 710 learned functions based on the evaluation 712 of the combined learned functions. The extender module 308 may request that the function generator module 301 generate 718 additional learned functions for the extender module 308 to extend. The function evaluator module 312 evaluates 720 the extended 716 learned functions. The function selector module 316 selects 722 at least two learned functions, such as the generated 706 learned functions, the combined 710 learned functions, the extended 716 learned functions, or the like, based on evaluation metadata from one or more of the evaluations 708, 714, 720.

The synthesizer module 310 synthesizes 724 the selected 722 learned functions into synthesized learned functions 324. The function evaluator module 312 evaluates 726 the synthesized learned functions 324 to generate a synthesized metadata rule set 322. The synthesizer module 310 organizes 728 the synthesized 724 learned functions 324 and the synthesized metadata rule set 322 into a machine learning ensemble 222. The interface module 402 provides 730 a result to the requesting client 404, such as the machine learning ensemble 222, a reference to the machine learning ensemble 222, an acknowledgment, or the like, and the interface module 402 continues to monitor 702 requests.

If the interface module 402 receives 702 an analysis request, the data receiver module 300 receives 732 workload data associated with the analysis request. The orchestration module 320 directs 734 the workload data through a machine learning ensemble 222 associated with the received 702 analysis request to produce a result, such as a classification, a confidence metric, an inferred function, a regression function, an answer, a recognized pattern, a recommendation, an evaluation, and/or another result. The interface module 402 provides 730 the produced result to the requesting client 404, and the interface module 402 continues to monitor 702 requests.

Figure 8:
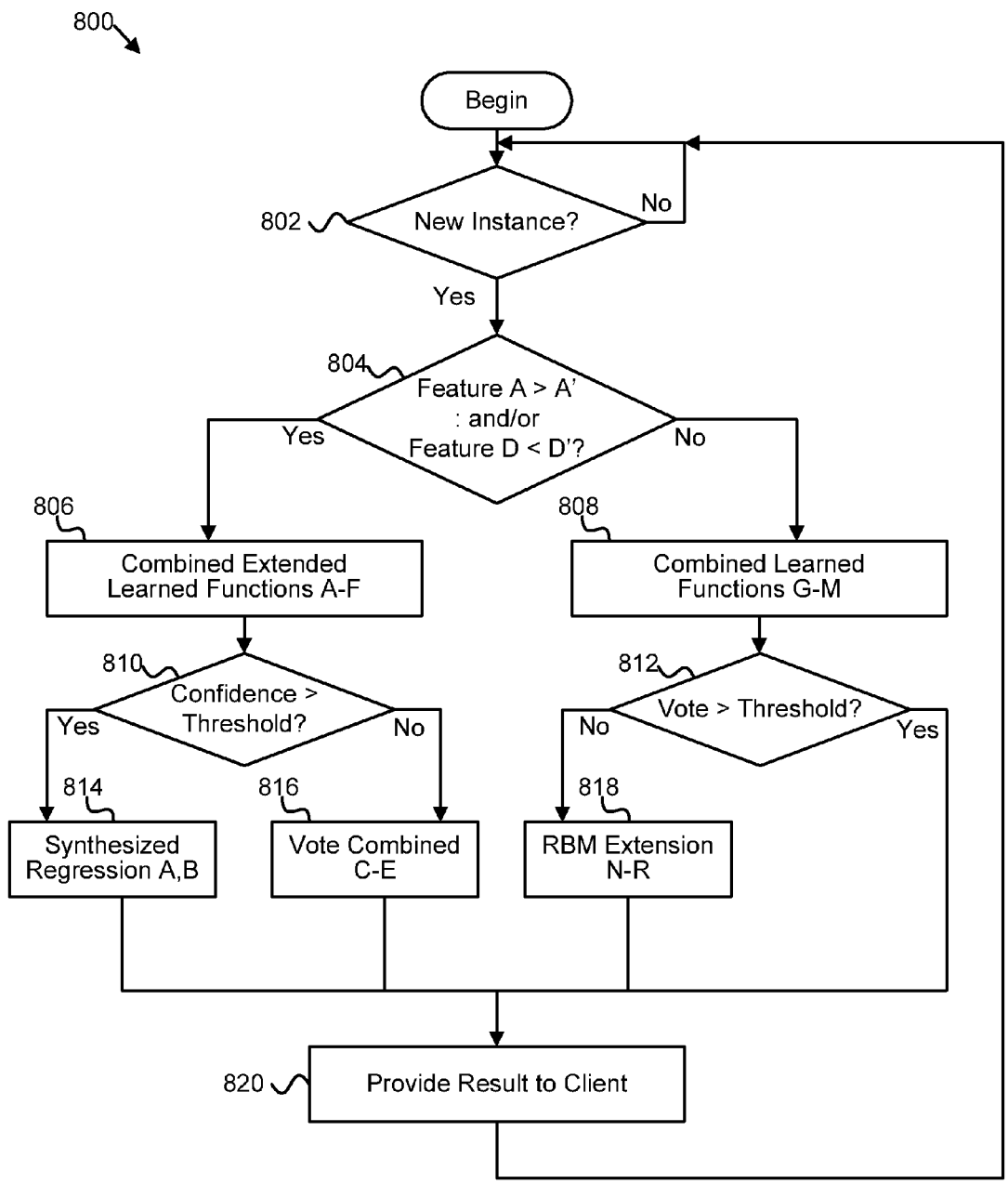
FIG. 8 is a schematic flow chart diagram illustrating one embodiment of a method for directing data through a machine learning ensemble.

FIG. 8 depicts one embodiment of a method 800 for directing data through a machine learning ensemble. The specific synthesized metadata rule set 322 of the depicted method 800 is presented by way of example only, and many other rules and rule sets may be used.

A new instance of workload data is presented 802 to the machine learning ensemble 222 through the interface module 402. The data is processed through the data receiver module 300 and configured for the particular analysis request as initiated by a client 404. In this embodiment the orchestration module 320 evaluates a certain set of features associates with the data instance against a set of thresholds contained within the synthesized metadata rule set 322.

A binary decision 804 passes the instance to, in one case, a certain combined and extended function 806 configured for features A-F or in the other case a different, parallel combined function 808 configured to predict against a feature set G-M. In the first case 806, if the output confidence passes 810 a certain threshold as given by the meta-data rule set the instance is passed to a synthesized, extended regression function 814 for final evaluation, else the instance is passed to a combined collection 816 whose output is a weighted voted based processing a certain set of features. In the second case 808 a different combined function 812 with a simple vote output results in the instance being evaluated by a set of base learned functions extended by a Boltzman type extension 818 or, if a prescribed threshold is meet the output of the synthesized function is the simple vote. The interface module 402 provides 820 the result of the orchestration module directing workload data through the machine learning ensemble 222 to a requesting client 404 and the method 800 continues.

Figure 9:
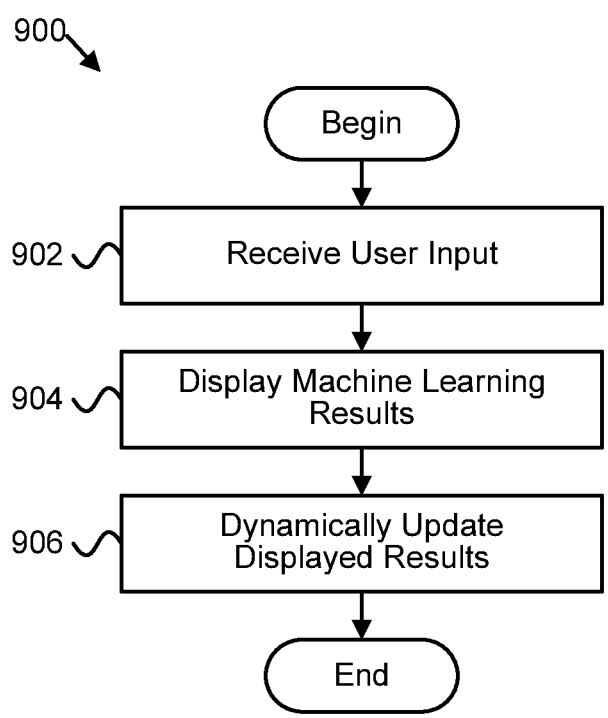
FIG. 9 is a schematic flow chart diagram illustrating one embodiment of a method for machine learning results.

FIG. 9 depicts one embodiment of a method 900 for machine learning results. The method 900 begins and an input module 202 receives 902 user input identifying a value for a machine learning parameter. A display module 204 displays 904 one or more machine learning results for the identified 902 machine learning parameter in response to the input module 202 receiving 902 the user input. The one or more machine learning results may be determined by a machine learning module 212 using machine learning, cached by a pre-compute module 208 in a results data structure, and retrieved using the identified 902 machine learning parameter, or the like. An update module 206 dynamically updates 906 the displayed 904 one or more machine learning results in response to the input module 202 receiving additional user input identifying an additional value for the machine learning parameter and the method 900 ends.

Figure 10:
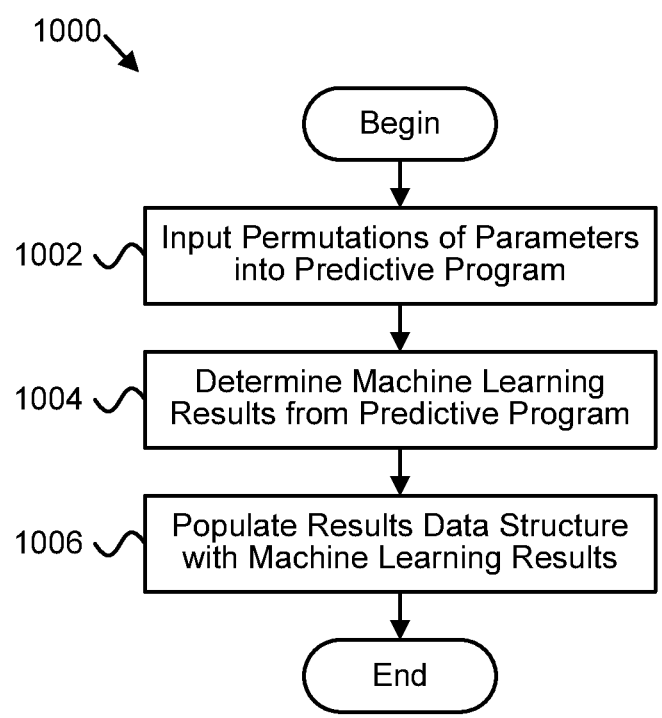
FIG. 10 is a schematic flow chart diagram illustrating another embodiment of a method for machine learning results.

FIG. 10 depicts one embodiment of a method 1000 for machine learning results. The method 1000 begins and a pre-compute module 208 inputs 1002 permutations of machine learning parameters incrementally between minimum values for the machine learning parameters and maximum values for the machine learning parameters into a predictive program 222. A machine learning module 212 determines 1004 machine learning results from the predictive program 222 for the input 1002 permutations of the machine learning parameters. The pre-compute module 208 populates 1006 a results data structure with the determined 1004 machine learning results indexed by the machine learning parameters and the method 1000 ends.

Figure 11:
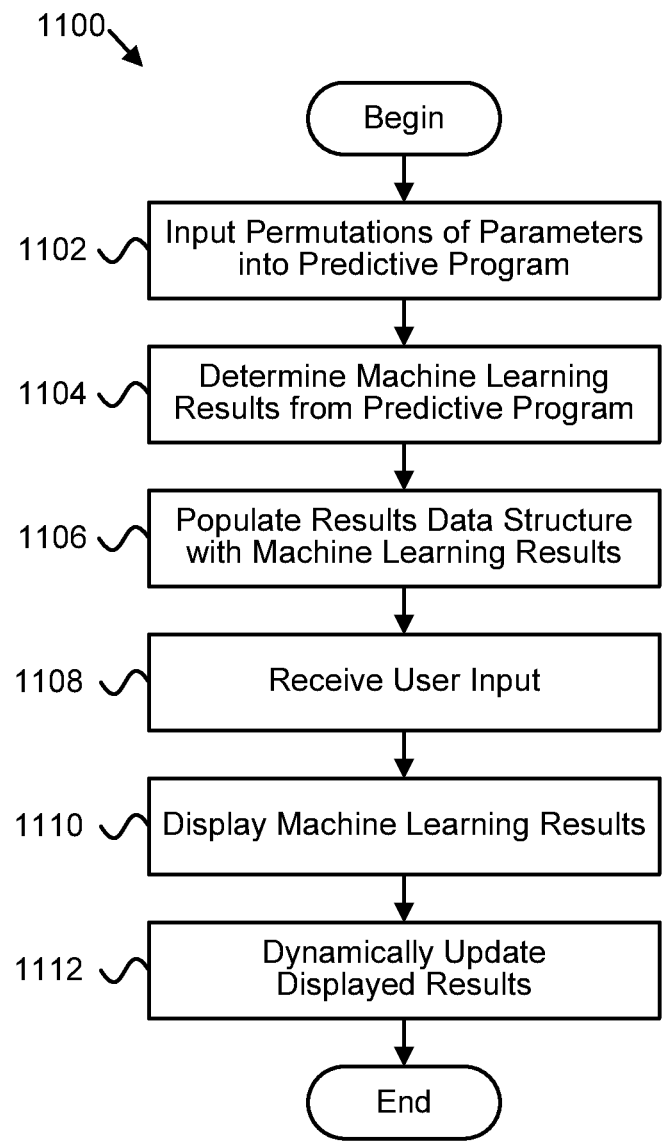
FIG. 11 is a schematic flow chart diagram illustrating a further embodiment of a method for machine learning results.

FIG. 11 depicts one embodiment of a method 1100 for machine learning results. The method 1100 begins and a pre-compute module 208 inputs 1102 permutations of machine learning parameters incrementally between minimum values for the machine learning parameters and maximum values for the machine learning parameters into a predictive program 222. A machine learning module 212 determines 1104 machine learning results from the predictive program 222 for the input 1102 permutations of the machine learning parameters. The pre-compute module 208 populates 1106 a results data structure with the determined 1104 machine learning results indexed by the machine learning parameters.

An input module 202 receives 1108 user input identifying a value for a machine learning parameter. A display module 204 displays 1110 one or more machine learning results for the identified 1108 machine learning parameter in response to the input module 202 receiving 1108 the user input. The one or more machine learning results may be determined by a machine learning module 212 using machine learning, cached by a pre-compute module 208 in a results data structure, and retrieved using the identified 1108 machine learning parameter, or the like. An update module 206 dynamically updates 1112 the displayed 1110 one or more machine learning results in response to the input module 202 receiving additional user input identifying an additional value for the machine learning parameter and the method 1100 ends.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for machine learning results, the apparatus comprising:
 a predictive compiler module configured to generate machine learning comprising program code for a plurality of learned functions, the code generated by the predictive compiler module to predict one or more machine learning results based on one or more machine learning parameters;
 an input module configured to receive user input identifying one or more values for the one or more machine learning parameters;
 a pre-compute module configured to predetermine, using the generated machine learning, permutations of the machine learning results at one or more increments between a minimum value and a maximum value for the one or more machine learning parameters, prior to the input module receiving the user input;
 a display module configured to display, from the pre-compute module, a first predetermined permutation of the one or more predicted machine learning results for the one or more identified machine learning parameters; and
 an update module configured to dynamically display, from the re-compute module a second permutation of the one or more machine learning results in response to the input module receiving additional user input identifying one or more additional values for the one or more machine learning parameters,
 wherein the predictive compiler module, the input module, the pre-compute module, the display module, and the update module comprise one or more of logic hardware and a non-transitory computer readable storage medium storing program code executable by a processor.

2. The apparatus of claim 1, wherein the pre-compute module is configured to cache the predetermined permutations of the machine learning results for the update module in a results data structure indexed by the one or more machine learning parameters.

3. The apparatus of claim 2, wherein the update module is configured to determine the second permutation of the one or more machine learning results by looking up the second permutation of the one or more machine learning results in the results data structure using the one or more additional values for the one or more machine learning parameters.

4. The apparatus of claim 1, wherein the display module is configured to display one or more attributes of a data set used by the machine learning to determine the one or more machine learning results and one or more impact metrics for each displayed attribute.

5. The apparatus of claim 1, wherein the plurality of learned functions are from multiple machine learning classes.

6. The apparatus of claim 1, further comprising a recommendation module configured to select a suggested set of machine learning results, the display module configured to display the suggested set of machine learning results to the user prior to the input module receiving the user input.

7. The apparatus of claim 1, wherein the one or more machine learning parameters comprise one or more of an input and an output of the machine learning adjusted by the user input and the machine learning results comprise one or more of an input and an output of the machine learning determined based on the one or more machine learning parameters.

8. The apparatus of claim 1, wherein the one or more machine learning parameters comprise one or more of an attribute of a feature, a target value for a goal, an action relating to a goal, a confidence metric, and a target of an action.

9. The apparatus of claim 1, wherein the machine learning results comprise one or more of an attribute of a feature, a target value for a goal, an action relating to a goal, a confidence metric, and a target of an action.

10. The apparatus of claim 1, wherein the input module is configured to receive the user input as an adjustment to a slider graphical user interface element corresponding to the one or more machine learning parameters.

11. The apparatus of claim 1, wherein the input module is configured to receive the user input as a user entry in a graphical table and the display module is configured to display the one or more machine learning results as entries in the graphical table.

12. The apparatus of claim 1, wherein the input module is configured to receive the user input as a user manipulation of a displayed object.

13. The apparatus of claim 12, wherein the user input comprises one or more of:
an adjustment to a size of the displayed object;
an adjustment to a vertical position of the displayed object;
an adjustment to a horizontal position of the displayed object;
an adjustment to an opacity of the displayed object;
an adjustment to a color of the displayed object;
an adjustment to a shape of the displayed object;
an adjustment to shading of the displayed object;
a text entry in a text box for the displayed object; and
user interaction with an animation for the displayed object.

14. The apparatus of claim 1, further comprising a collaboration module configured to determine an impact on the one or more machine learning results based on different user input received from a different user.

15. The apparatus of claim 14, wherein the input module is configured to receive the different user input from the different user, the different user input identifying a different value for a different machine learning parameter, the display module configured to display multiple sets of one or more machine learning results to multiple users, and the update module configured to dynamically update the displayed multiple sets of one or more machine learning results.

16. A method for machine learning results, the method comprising:
generating a predictive program comprising a plurality of learned functions from multiple machine learning classes;
inputting permutations of machine learning parameters incrementally between minimum values for the machine learning parameters and maximum values for the machine learning parameters into the predictive program;
determining machine learning results from the predictive program for the input permutations of the machine learning parameters;
populating a results data structure with the determined machine learning results indexed by the machine learning parameters;
dynamically changing a display of one or more input permutations of the machine learning parameters from the results data structure in response to user input adjusting a displayed value for one or more of the machine learning results from the predictive program.

17. The method of claim 16, wherein the results data structure is populated prior to receiving user input identifying a value for a machine learning parameter.

18. The method of claim 17, further comprising dynamically changing a display of one or more of the machine learning results from the results data structure in response to user input selecting a value for a machine learning parameter.

19. The method of claim 16, further comprising determining, from the results data structure, an impact on machine learning results from a different predictive program caused by the user input adjusting the displayed value for the one or more of the machine learning results.

20. The method of claim 19, further comprising displaying the impact on machine learning results from the different predictive program.

21. A system for machine learning results, the system comprising:
a predictive compiler module configured to generate a plurality of predictive programs each comprising a plurality of learned functions;
a pre-compute module configured to predetermine, using the predictive programs, permutations of machine learning results for each of the predictive programs at predefined increments between minimum values for machine learning parameters and maximum values for the machine learning parameters;
an input module configured to receive user input from one or more users identifying one or more values for one or more of the machine learning parameters for a first subset of the predictive programs;
a collaboration module configured to determine, using the predetermined permutations of machine learning results, an impact on machine learning results from a different one of the predictive programs based on the one or more identified values for the one or more of the machine learning parameters for the first subset of the predictive programs; and
a display module configured to display at least the impact on the machine learning results to the one or more users,
wherein the predictive compiler module, the pre-compute module, the input module, the collaboration module, and the display module comprise one or more of logic hardware and a non-transitory computer readable storage medium storing program code executable by a processor.

22. The system of claim 21, further comprising an update module configured to dynamically update the display of the at least the impact on the machine learning results, using the predetermined permutations of the machine learning results, in response to the one or more users identifying one or more different values for one or more of the machine learning parameters.

23. The system of claim 21, wherein the one or more users comprise multiple users, the one or more values comprise multiple values, and the multiple users identify the multiple values for different predictive programs of the first subset of the predictive programs.

24. The system of claim 23, wherein the display module is configured to display the impact on the machine learning results on a shared display for the multiple users and to display the machine learning results for the different predictive programs on different displays for the multiple users.

25. The system of claim 23, wherein the input module is configured to receive the user input from one or more of:
   separate client devices for the multiple users over a data network; and
   a shared interface for the multiple users on a single device.

* * * * *